(12) United States Patent
Sohma et al.

(10) Patent No.: US 7,051,048 B2
(45) Date of Patent: May 23, 2006

(54) DATA MANAGEMENT SYSTEM, DATA MANAGEMENT METHOD, AND PROGRAM

(75) Inventors: Hidetomo Sohma, Kanagawa (JP); Tomomi Takata, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 316 days.

(21) Appl. No.: 09/961,423

(22) Filed: Sep. 25, 2001

(65) Prior Publication Data

US 2002/0040360 A1 Apr. 4, 2002

(30) Foreign Application Priority Data

Sep. 29, 2000 (JP) .............................. 2000-299972
Sep. 29, 2000 (JP) .............................. 2000-299973
Aug. 27, 2001 (JP) .............................. 2001-256641

(51) Int. Cl.
G06F 17/30 (2006.01)
(52) U.S. Cl. .............................. 707/200; 707/1; 707/3; 707/100; 707/104.1
(58) Field of Classification Search .................... 707/3, 707/6, 10
See application file for complete search history.

(56) References Cited

U.S. PATENT DOCUMENTS 5,920,856 A * 7/1999 Syeda-Mahmood ............ 707/3
6,466,941 B1 * 10/2002 Rowe et al. ................. 707/102
6,609,123 B1 * 8/2003 Cazemier et al. ............... 707/4
6,910,049 B1 * 6/2005 Fenton et al. ............ 707/104.1

FOREIGN PATENT DOCUMENTS

JP 11-096194 4/1999
JP 11-250104 9/1999

* cited by examiner

*Primary Examiner*—Frantz Coby
*Assistant Examiner*—Marc R. Filipczyk
(74) *Attorney, Agent, or Firm*—Fitzpatrick, Cella, Harper & Scinto

(57) ABSTRACT

According to this invention, upon managing a plurality of data by individually appending meta data used to search for the data, an input sheet that describes predetermined candidates of meta data is prepared, the user selects meta data from the candidates of meta data, and the selected meta data is saved in association with the data. Upon making a search, a data search is conducted using meta data, and after the data found by search are partially provided to the user, the user selects desired data. In this way, everyone can easily and efficiently append information for a search to data to be managed.

23 Claims, 20 Drawing Sheets

FIG. 4

| TYPE OF EVENT | META DATA CANDIDATE |
|---|---|
| WEDDING RECEPTION | BRIDEGROOM, BRIDE |
| . | . |
| ENTRANCE OF BRIDAL COUPLE | BRIDEGROOM, BRIDE, SPOTLIGHT |
| SPEECH | GUESTS, FRIENDS, APPLAUSE, LAUGH |
| ENTERTAINMENT | VIDEO, FRIENDS, LAUGH |
| . | . |
| . | . |
| EXCURSION | CHILDREN, TEACHER |
| . | . |

FIG. 9

| META DATA | DATA |
|---|---|
| BRIDEGROOM | DATA X: FRAMES XX TO YY: FRAMES AA TO BB··· |
| BRIDE | DATA X: FRAMES XX TO YY: FRAMES AA TO BB··· |
| WEDDING RECEPTION | DATA X, DATA Y··· |
| · | · |
| · | · |
| · | · |

F I G. 20
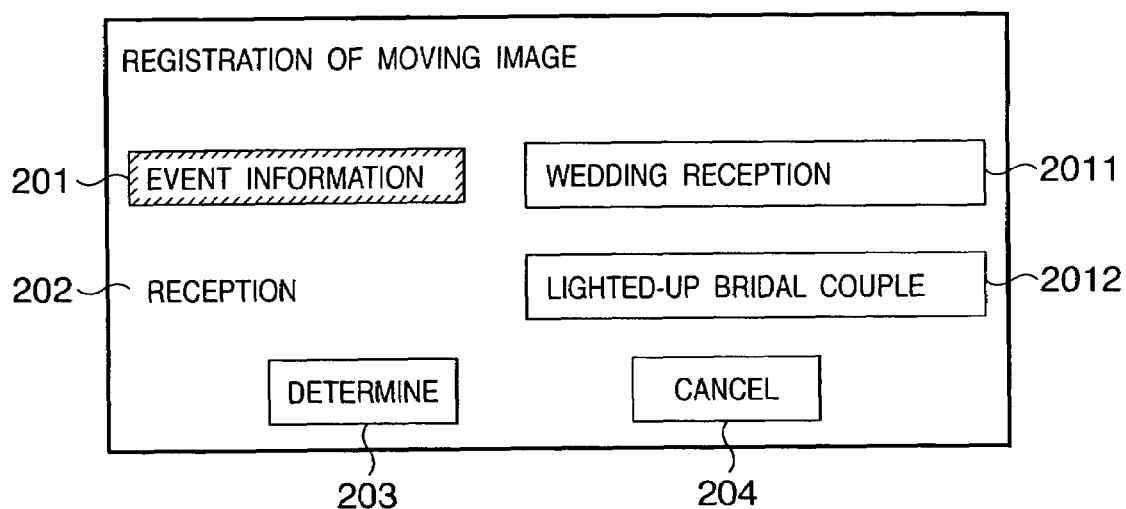

DATA MANAGEMENT SYSTEM, DATA MANAGEMENT METHOD, AND PROGRAM

FIELD OF THE INVENTION

The present invention relates to a data management technique for data search.

BACKGROUND OF THE INVENTION

Along with the improvement of performance and a price reduction of small-scale computer systems, some home electronic products incorporate computers for the purpose of their control and information processes. Also, high-quality video and audio contents (e.g., video, music, and the like) are supplied as digital data, and multimedia contents including these contents are distributed.

Furthermore, the prevalence of the Internet as a worldwide computer network and inexpensive mobile communication devices in recent years allow users to easily acquire and enjoy these contents.

Also, home video devices are transiting from those that record broadcast as analog data and is used to enjoy video, music, and the like supplied via media to those which record moving image and audio data as high-quality, deterioration-free digital data. Also, with the advent of home-use video cameras due to the development of compact, low-cost video recorders, users can capture video images in their home and can enjoy watching them.

Under such circumstance, the volume of contents to be video-captured and edited, that have been conventionally made by broadcast-related companies, is on the increase.

Note that broadcast-related companies have sophisticated devices for video capture and editing, and engineers who have high skills for editing and organizing contents to allow easy understanding. But it is not customary to edit contents captured by home-use video cameras since required devices are expensive and expert edit techniques are required.

However, not only moving images captured in the home but also information and contents delivered to the home via communication means such as various media, Internet, and the like are increasing, and are changing to multimedia information and contents such as video, audio, and the like. Hence, an information search function of such information and contents becomes very important.

Since the infrastructures for distributing and submitting information such as the Internet have been expanded, end users can submit information, especially, video and audio. In the future, necessity of an information search function of such multimedia information and contents is projected to become very high. The search function must be easy to use, and various results found by search must be easy to understand.

Furthermore, since latest information and contents can be easily delivered in real time via continual connection to the Internet and mobile communications, it is very important even for broadcast-related companies and the like to efficiently acquire latest video image and the like and to, e.g., edit them. In such situation, a function of quickly searching existing information and contents and reflecting them in new information and contents is required.

However, data such as moving images which have large information volumes and capture contents that change along with an elapse of time are too bulky to store, and it is very hard to easily search their contents. In case of document data which is also digital data, it is easy for a computer to search for portions including designated characters and words. However, in case of video, audio, and the like, it is rare to search for data which is perfectly the same as query data, but it is general to search for a portion which is similar in some sense.

With the existing technique, a computer cannot sufficiently understand contents expressed by video, audio, and the like, and a search for such data contents is not satisfactory.

To solve this problem, a linguistic description such as keywords, comments, and the like which express contents and features of such moving images, still images, audio data, and the like, or nonlinguistic information that describes features of images and audio in a format that a computer can process is appended to the contents or information as information for search, i.e., so-called meta data, thus facilitating the search and use of such contents.

However, it is not always easy to adequately and efficiently append meta data to data to be managed. Especially, it is harder for an end user to append meta data to video data captured by a home video camera or the like since he or she has neither expert knowledge nor technique. Also, data search results using meta data must be provided in a form that is easy to understand for the user.

SUMMARY OF THE INVENTION

It is a principal object of the present invention to allow everyone to easily and efficiently append information for search to data to be managed.

It is another object of the present invention to provide search results based on information appended to data to be managed in a form that is easy to understand for the user.

According to the present invention, there is provided a data management system for managing data by individually appending meta data for a data search to data to be managed, comprising:

means for accepting selection of the data to which the meta data is to be appended;

means for providing predetermined candidates of meta data;

means for accepting selection of meta data to be appended to the selected data from the provided candidates of meta data; and means for saving the selected data and the selected meta data in association with each other.

According to the present invention, there is also provided a data management method for managing data by individually appending meta data for a data search to data to be managed, comprising:

the step of accepting selection of the data to which the meta data is to be appended;

the step of providing predetermined candidates of meta data;

the step of accepting selection of meta data to be appended to the selected data from the provided candidates of meta data; and the step of saving the selected data and the selected meta data in association with each other.

According to the present invention, there is also provided a program for, upon managing data by individually appending meta data for a data search to data to be managed, making a computer function as:

means for accepting selection of the data to which the meta data is to be appended;

means for providing predetermined candidates of meta data;

means for accepting selection of meta data to be appended to the selected data from the provided candidates of meta data; and means for saving the selected data and the selected meta data in association with each other.

According to the present invention, there is also provided a data management system for managing data by individually appending meta data for a data search to data to be managed, comprising:

means for accepting selection of the data to which the meta data is to be appended;

means for providing predetermined candidates of meta data;

means for accepting selection of meta data to be appended to the selected data from the provided candidates of meta data;

means for saving the selected data and the selected meta data in association with each other;

means for accepting input of a search condition used to search for the data;

means for searching for the data associated with the search condition on the basis of the input search condition and the meta data; and means for partially providing contents of the data found by search.

According to the present invention, there is also provided a data management method for managing data by individually appending meta data for a data search to data to be managed, comprising:

the step of accepting selection of the data to which the meta data is to be appended;

the step of providing predetermined candidates of meta data;

the step of accepting selection of meta data to be appended to the selected data from the provided candidates of meta data;

the step of saving the selected data and the selected meta data in association with each other;

the step of accepting input of a search condition used to search for the data;

the step of searching for the data associated with the search condition on the basis of the input search condition and the meta data; and the step of partially providing contents of the data found by search.

According to the present invention, there is also provided a program for, upon managing data by individually appending meta data for a data search to data to be managed, making a computer function as:

means for accepting selection of the data to which the meta data is to be appended;

means for providing predetermined candidates of meta data;

means for accepting selection of meta data to be appended to the selected data from the provided candidates of meta data;

means for saving the selected data and the selected meta data in association with each other;

means for accepting input of a search condition used to search for the data;

means for searching for the data associated with the search condition on the basis of the input search condition and the meta data; and means for partially providing contents of the data found by search.

According to the present invention, there is also provided a data management system for managing data by individually appending meta data for a data search to data to be managed, comprising:

means for providing predetermined candidates of meta data;

means for accepting selection of meta data from the provided candidates of meta data;

means for inputting data to which the selected meta data is appended; and means for saving the selected meta data and the input data in association with each other.

According to the present invention, there is also provided a data management method for managing data by individually appending meta data for a data search to data to be managed, comprising:

the step of providing predetermined candidates of meta data;

the step of accepting selection of meta data from the provided candidates of meta data;

the step of inputting data to which the selected meta data is appended; and the step of saving the selected meta data and the input data in association with each other.

According to the present invention, there is also provided a program for, upon managing data by individually appending meta data for a data search to data to be managed, making a computer function as:

means for providing predetermined candidates of meta data;

means for accepting selection of meta data from the provided candidates of meta data;

means for inputting data to which the selected meta data is appended; and means for saving the selected meta data and the input data in association with each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows an example of a table that stores the types of events and meta data candidates set for respective events;

FIG. 5 shows an example of a template which defines correlation among events, meta data candidates, and the like;

FIG. 9 shows an example of index information used in data search;

FIG. 12 shows another example of a template which defines correlation among events, meta data candidates, and the like;

FIG. 20 shows a display example on the display unit upon appending meta data.

DETAILED DESCRIPTION OF THE PREFERRED EMBODIMENTS

Preferred embodiments of the present invention will now be described in detail in accordance with the accompanying drawings.

Figure 1:
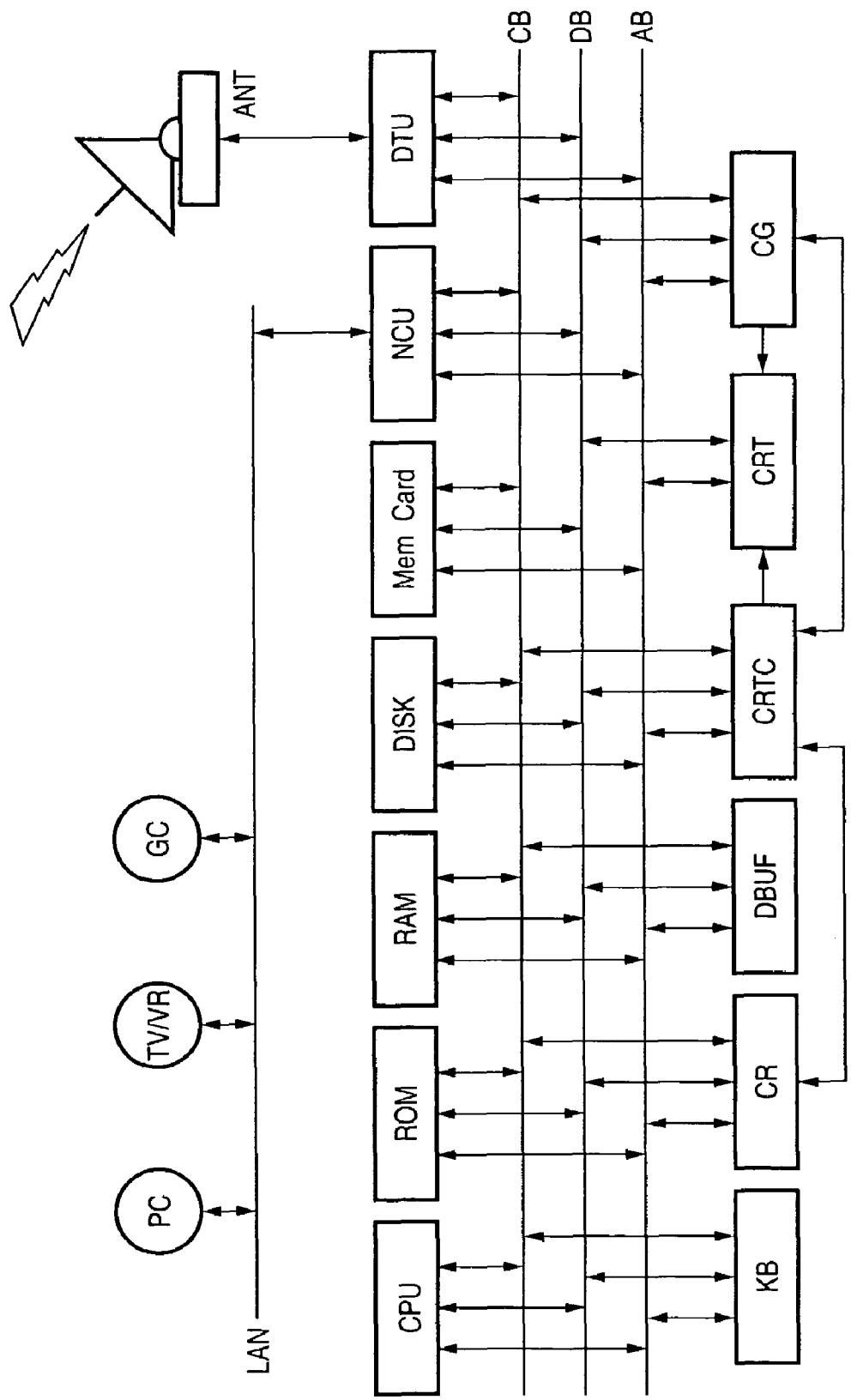
FIG. 1 is a block diagram showing an example of the arrangement of a computer apparatus on which a data management system according to an embodiment of the present invention is built.

FIG. 1 is a block diagram showing an example of the arrangement of a computer apparatus on which a data management system according to an embodiment of the present invention is built.

Referring to FIG. 1, reference symbol CPU denotes a microprocessor which makes arithmetic operations, logical decisions, and the like for various processes, and controls building components connected to an address bus AB, control bus CB, and data bus DB via these buses. The contents of processes to be executed by the CPU are designated by programs on a ROM and RAM (to be described later).

A plurality of computer programs can parallelly run by the function of the CPU itself or mechanisms of computer programs.

The address bus AB transfers an address signal that designates a building component to be controlled by the CPU. The control bus CB transfers and applies a control signal of each building component to be controlled by the microprocessor CPU. The data bus DB transfers data among respective building components.

The ROM is a read-only permanent memory. The ROM stores a computer program area and data area that store the control sequence (to be described later) of the microprocessor CPU.

The RAM is a rewritable random-access memory, and is used as a computer program area and data area that store the control sequence (to be described later) of the microprocessor CPU, and also as a temporary storage area of various computer programs and various data from building components other than the CPU.

These storage media such as the ROM, RAM, and the like store computer programs, data, and the like which implement data management of this embodiment. Functions of this embodiment are implemented when program codes stored in these storage media are read out and executed by the CPU. In such case, the types of storage media are not particularly limited.

A storage medium that stores programs and data according to the present invention may be supplied to a system or apparatus, and the stored programs may be copied from the storage medium onto another rewritable storage medium such as a RAM or the like. As such storage medium, a CD-ROM, floppy disk, hard disk, memory card, magnetooptical disk, and the like may be used. The present invention can be applied to such system.

Figure 2:
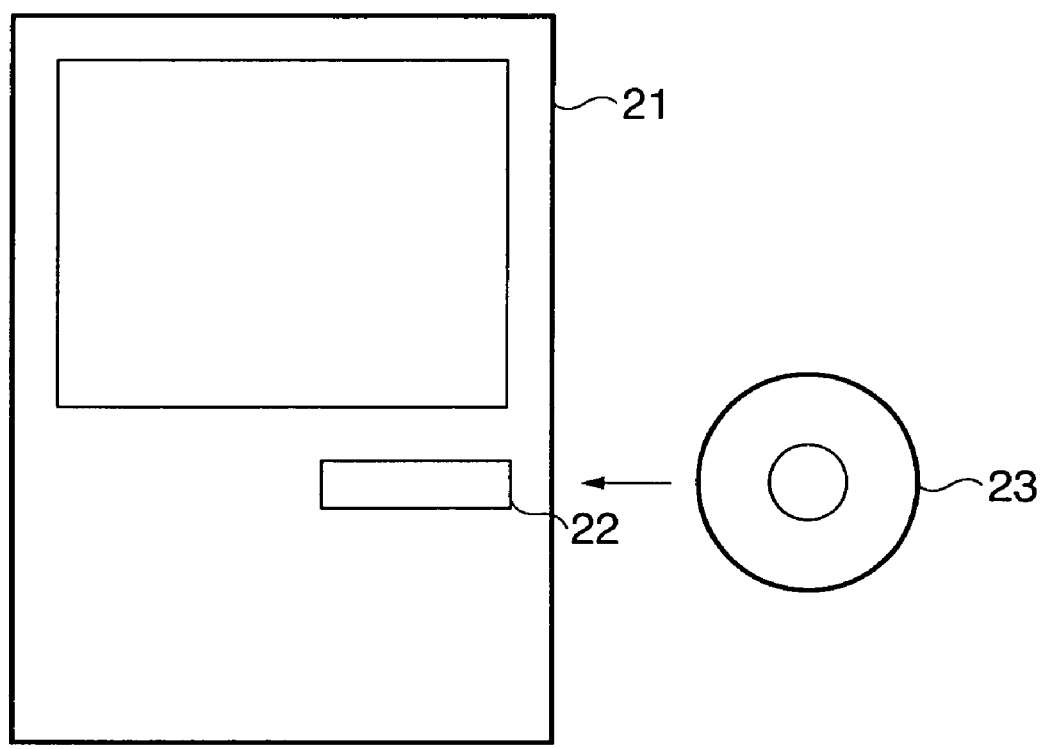
FIG. 2 shows a mode in which an external recording or storage medium that stores, e.g., a data management program according to an embodiment of the present invention is loaded into a computer apparatus.

As shown in FIG. 2, a data management program of this embodiment can be loaded from a medium that stores a computer program. In FIG. 2, reference numeral 21 denotes a computer apparatus having the arrangement shown in FIG. 1; 22, a drive for loading a storage medium; and 23, a storage medium that stores a computer program.

Referring back to FIG. 1, reference symbol DISK denotes a hard disk, which serves as an external memory for storing various data and the like. The DISK incorporates a storage medium which can read/write a large volume of information at relatively high speed, and can save or read out various data in or from that medium as needed. Computer programs and data saved in the DISK are fully or partially read out onto the RAM as needed in accordance with an instruction input at a keyboard or instructions of various computer programs.

Reference symbol MemCard (memory card) denotes a detachable storage medium. When information is stored in this storage medium, and that storage medium is connected to another device, the stored information can be referred to or transferred.

Reference symbol KB denotes a keyboard which has text/symbol input keys such as alphabet keys, hiragana keys, katakana keys, comma key, and the like, and various function keys such as cursor keys for instructing cursor movement, and the like. Also, a pointing device such as a mouse may be included.

Reference symbol CR denotes a cursor register. The CPU can read/write the contents of the cursor register. A CRT controller CRTC (to be described later) displays a cursor at that position on a display device CRT which corresponds to an address stored in the cursor register.

Reference symbol DBUF denotes a display buffer which stores patterns of data to be displayed. The CRT controller CRTC has a role of displaying the contents stored in the cursor register CR and buffer DBUF on the display device CRT.

The display device CRT uses a cathode ray tube, or the like, and dot-display patterns and the cursor to be displayed on the display device CRT are controlled by the CRT controller. Furthermore, reference symbol CG denotes a character generator which stores character and symbol patterns to be displayed on the display device CRT.

Reference symbol NCU denotes a communication device for communicating with another computer apparatus and the like. Using this device, the programs and data of this embodiment can be shared by other apparatuses. In FIG. 1, the NCU is connected to a personal computer (PC), a reception/storage/display device (TV/VR) of television broadcast and video captured by the user, a home game computer (GC), and the like via a network (LAN) and can freely exchange information with them. Needless to say, devices connected to the apparatus of the present invention via the network are not particularly limited. Note that the type of network is not particularly limited. For example, in place of the closed network shown in FIG. 1, the network may be connected to an external network.

Reference symbol DTU denotes a reception device that implements a reception function of simulcast communications using an artificial satellite or the like, and has a function of receiving a radio wave or the like broadcasted via the artificial satellite by a parabola antenna (ANT), and extracting broadcast data. Various simulcast communication patterns are available: for example, broadcast using a ground wave, broadcast via coaxial cables or optical cables, delivery via the LAN or large-scale network, and the like. The present invention can use any type of simulcast communications.

<Concept of Data Management in This Embodiment>

The concept of data management in the data management system of this embodiment will be explained below.

In general, one may expect that data to be managed have miscellaneous contents upon data management, but the contents of data to be processed are actually predictable to some extent or are limited to a given range. For example, when files of moving image data are managed, their contents include videos of ordinary events in everyday life such as ceremonial occasions, growth record of children, video captured on trips, and the like, videos of dramas, news, and the like, and can be categorized as needed.

The detailed contents of data are predictable to some extent from our experience in accordance with the types of contents of data. For example, the video of a wedding reception starts from entrance of a bridal couple, and includes videos of individual scenes such as speeches of guests, toast, entertainment, and the like. On the other hand, the video of a detective drama includes those of scenes such as occurrence of a case, criminal investigation, solution, and the like. Furthermore, persons, articles, situations, and the like of individual scenes are predictable to some extent.

Hence, the contents of meta data to be appended to these data include common factors depending on the types of contents of data.

In this embodiment, candidates to be appended as meta data are generated in advance in correspondence with the types of contents of data, and are presented to the user to allow him or her to select them, thus easily and efficiently appending meta data. Since meta data to be appended are processed by a specific method, an efficient data search can also be implemented.

In this embodiment, in order to generate meta data candidates, data to be managed are categorized for respective types in accordance with their contents. In this embodiment, the data are categorized in units of ordinary events. For example, the ordinary events include a wedding reception, overseas trip, and the like.

It is most probable from our experience that each event is made up of a plurality of events. For example, an event of a wedding reception is made up of small individual events such as entrance of a bridal couple, speeches of guests, toast, and the like. Hence, in this embodiment, each event is defined by a plurality of events, and meta data candidates are generated for respective events.

Figure 3:
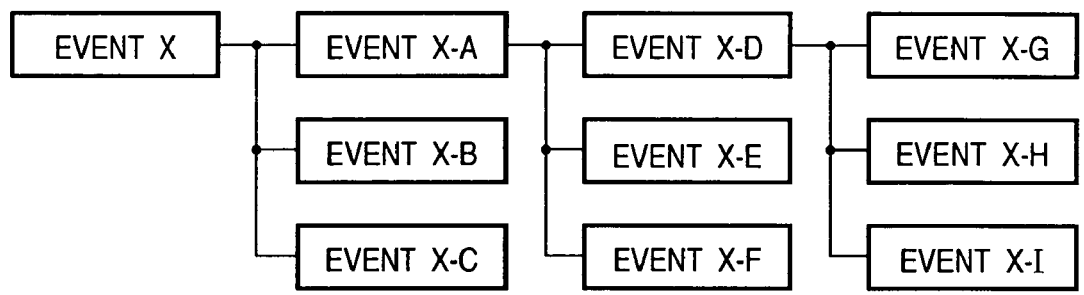
FIG. 3 shows an example of information that defines the relationship among events, i.e., the inclusion relationship of individual events X-A to X-I contained in given event X.

FIG. 3 shows an example of information that defines the relationship among events, i.e., the inclusion relationship of individual events X-A to X-I included in given event X. As can be seen from FIG. 3, event X includes events X-A to X-C, and event X-A includes events X-D and X-E.

For example, if event X is a wedding reception, events X-A to X-C respectively correspond to an opening, dinner, and climax, and events X-D and X-E as sub-events of event X-A respectively correspond to entrance of a bridal couple and speeches of guests.

Meta data candidates are objects such as persons, articles, and the like or situations which are known to appear from our experience, and can be set more easily and adequately as an event is segmented finer.

FIG. 4 shows an example of a table which stores the types of events, and meta data candidates set for respective events. In FIG. 4, a wedding reception is listed as an event, and entrance of a bridal couple, speeches, and entertainment are listed as sub-events. Since a bridal couple is known from our experience as an object or the like which appear in the wedding reception, the bridal couple is listed as a meta data candidate. As a situation upon entrance of the bridal couple, spotlight is considered from our experience, and is listed as a meta data candidate. Such information can be stored in the DISK or the like in FIG. 1. This embodiment is suitable for categorizing the contents of home video and appending meta data thereto since events are used as units. However, the present invention can be applied to contents other than video by selecting a reference unit in correspondence with the contents.

In this embodiment, the type of event and meta data candidates are meta data to be finally appended to data, and are used as index information upon making a search. In this case, the relationships among events and among meta data candidates can be defined in advance to attain an efficient and adequate data search, and such information can also be stored in the DISK or the like in FIG. 1.

Figure 5:
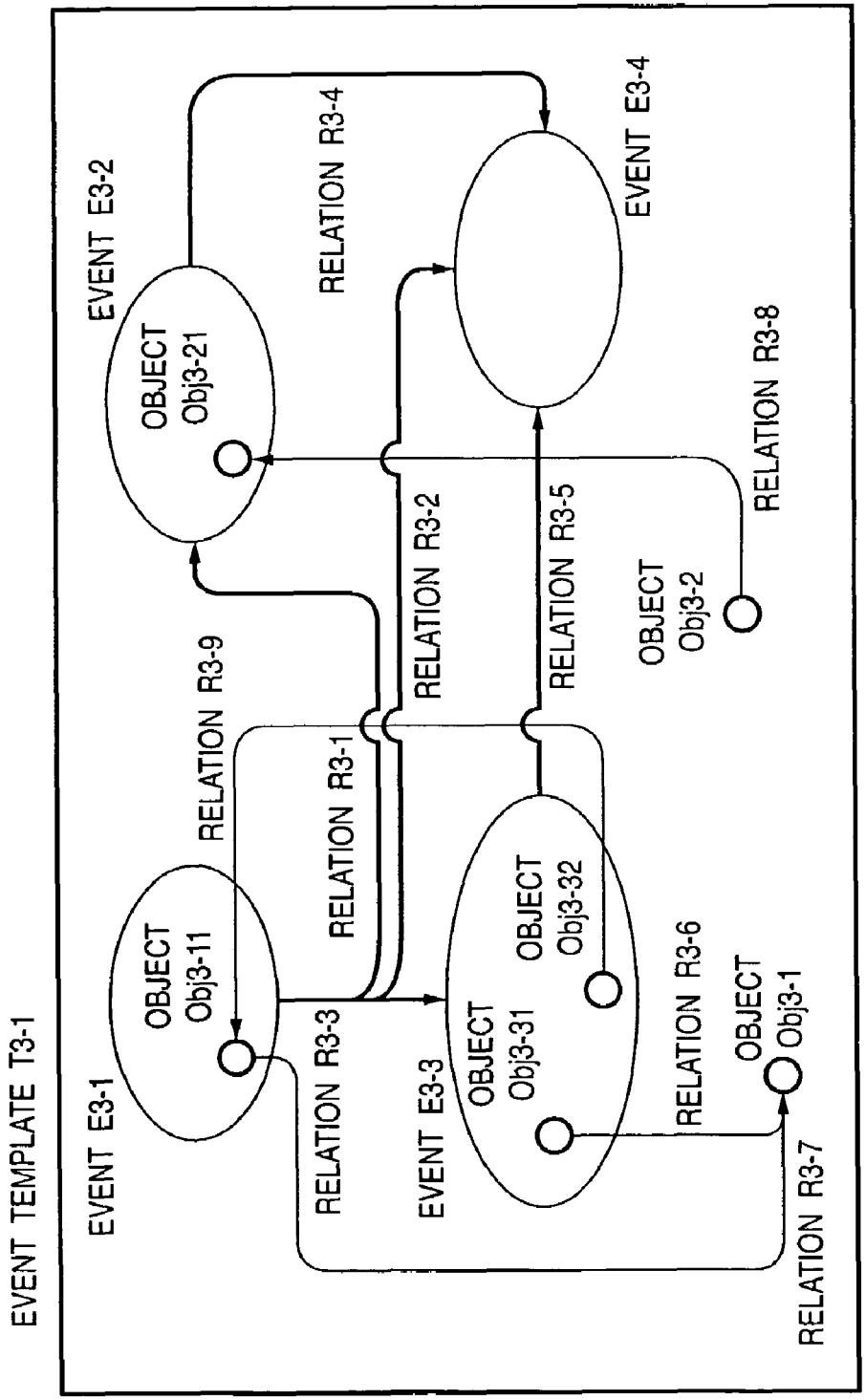

FIG. 5 shows an example of a template which defines correlation of such events, meta data candidates, and the like. One template corresponds to one event, and indicates individual events included in that event, objects as meta data candidates, and their relations.

Event template T3-1 includes a plurality of events E3-X (X=numerals). This is because one event is made up of sub-events having time and causality. Also, objects such as persons, articles, and the like associated with the event are present, and are represented by Obj3-X (X=numerals) in FIG. 5.

Objects include those which appear in only individual events, and those which commonly appear in the entire event. In FIG. 5, since only objects Obj3-1 and Obj3-2 appear commonly, they are bounded not by specific events but by only the frame of event template T3-1.

By contrast, other objects are bounded by individual events, i.e., they appear in only specific events. Objects have given relations, and events also have given relations. Such relations are indicted by R3-X (X=numerals). The events, objects, and their relations in this event template T3-1 can have various attributes.

For example, if this event template corresponds to that of the wedding reception, object Obj3-1 having an attribute "bridegroom" and object Obj3-2 having an attribute "bride" appear in most of the events in the template.

Object Obj3-11 having friend relation R3-7 with the bridegroom and an attribute "toastmaster" declares the beginning of the reception, and bridegroom Obj3-1 and bride Obj3-2 then enter the reception room (so-called bride couple entrance event E3-1).

In this way, the relationship among the events, meta data candidates, and the like is defined in advance, and such information is used upon making a data search.

<Append Meta Data>

The meta data appending process executed in the data management system of this embodiment under such basic concept will be explained below. With the process to be described below, everyone can easily and efficiently append information for search to data to be go managed.

In this embodiment, upon managing various data of multimedia information and contents such as moving images, still images, audio, and the like, meta data are appended to facilitate a search for these data. Upon appending such meta data, after data to be processed is selected by the user, a meta data input sheet which lists meta data candidates for respective events is presented to the user to input data.

Since meta data candidates are provided, even an end user who has no expert knowledge about appending of meta data and a data search technique can easily efficiently append meta data. Also, a user who has expert knowledge can efficiently append meta data. Furthermore, the expression form of meta data can be standardized and simplified, thus improving search efficiency.

The input sheet can be stored in storage devices such as the DISK, ROM, RAM, MemCard, and the like in FIG. 1. Also, the input sheet may be acquired via the LAN or the like, and may be stored in a storage device when it is used.

Figure 6:
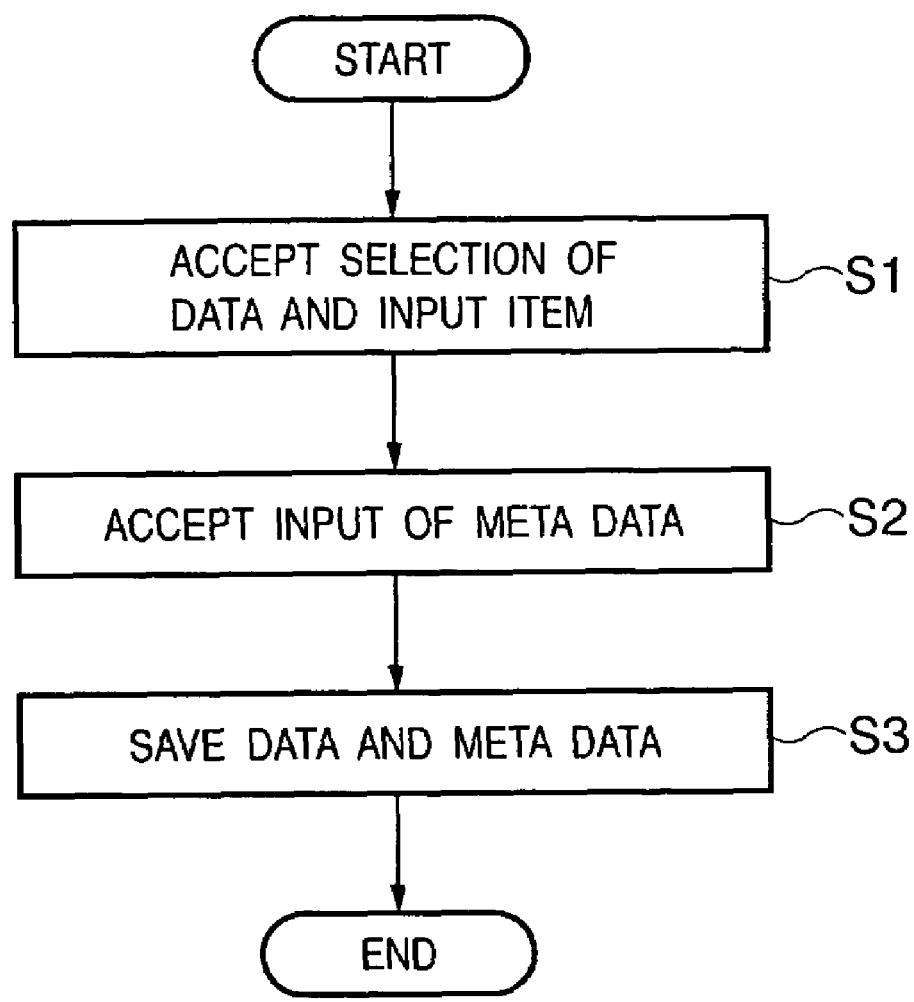
FIG. 6 is a flow chart showing the flow of meta data appending process.

The meta data appending process in the data management system will be described below using an example. FIG. 6 is a flow chart showing the flow of this process.

In step S1, the data management system accepts selection of data, and selection of input items of the input sheet. The data and input items of the input sheet are displayed on the CRT in, e.g., a list format, and the user can select them from the KB. After the input sheet and data are selected, the data management system displays them on the CRT.

Note that data may be selected in units of partial data (called sub-data in this embodiment) that form each data. As the sub-data, for example, when data is moving image data, data of an image of each frame, a group of successive frame images, and the like may be used. That is, the sub-data can correspond to individual events which make up each event.

In step S2, the data management system accepts meta data input to the input sheet. The user can input meta data from the KB in accordance with the input items listed on the input sheet. Note that "input" is a broad concept including a case wherein character strings such as YES/NO, detailed keywords, and the like are input to the presented input items, and a case wherein one of presented choices is selected.

Figure 7:
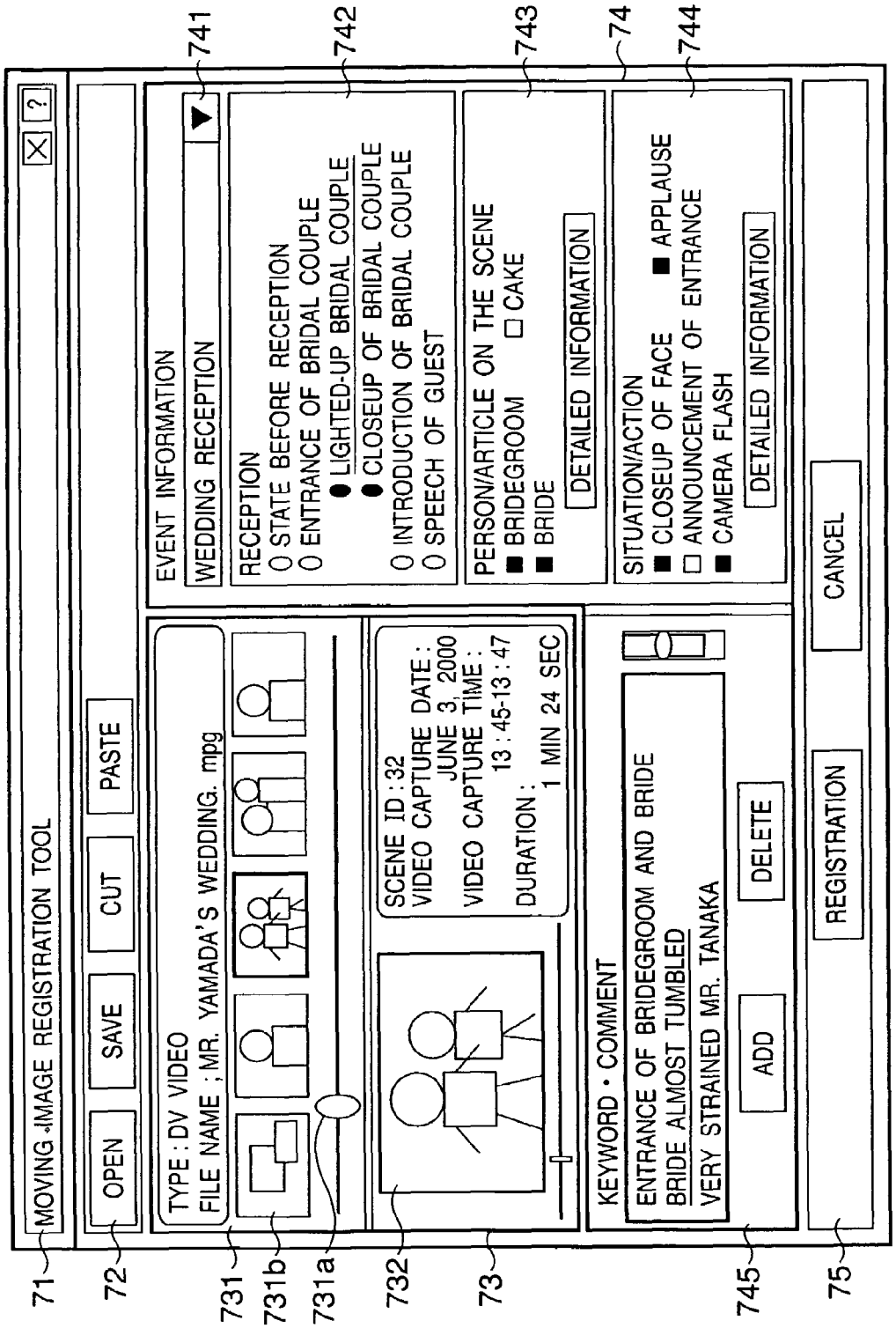
FIG. 7 shows a display example on a CRT upon inputting meta data.

An example of the processes in steps S1 and S2 will be explained below. FIG. 7 shows a display example on the CRT upon inputting meta data. FIG. 7 shows an example of the screen when a window system is used, and assumes a case wherein meta data are appended to sub-data indicating some frame images or groups of successive frame images contained in moving image data obtained by capturing a wedding reception.

Reference numeral 71 denotes a so-called title bar which is used to operate this window, e.g., to move the window or to change the size of the window. Reference numeral 72 denotes a so-called tool bar with which principal functions in this window can be easily called. When the user selects an "open" button on the tool bar 72, a list of data to be managed appears, and the user can select data to which meta data are to be appended.

A rectangular region 73 bounded by the bold line displays selected data, and an inverted-L-shaped region 74 bounded by the bold line displays an input sheet. In this embodiment, an image associated with data to which meta data are to be appended, and the input sheet are displayed together, and the image and meta data candidates are displayed together.

An upper portion 731 of the region 73 indicates a file name of the selected moving image data, and one scene in a moving image file "Mr. Yamada's wedding.mpg" recorded using a digital video camera undergoes a process.

When a slider 731a is operated using the KB in FIG. 1, an arbitrary scene in this moving image file can be selected, and a region 431b displays five frame images contained in the currently selected scene. The user can select one frame or a group of a series of frames within a predetermined time range to which meta data is to be appended.

Note that this embodiment appends meta data for the purpose of a data search of multimedia data and the like. Also, this embodiment can be included as some functions of an apparatus for editing, modifying, or reproducing multimedia data, and the need for these functions may be omitted or higher-level functions may be provided in accordance with, e.g., the edit result.

A lower portion 732 of the region 73 is used to play back a scene selected from the frame images on a region 731b, and displays an image (bold frame) of sub-data to which meta data is to be appended. If information indicating the video capture time of this scene and the like is available, it is displayed within this portion (right portion). Using this portion, the user can recognize the contents of the scene of his or her choice. Note that the sub-data may use data of a single frame image as one unit, and also data of a group of frame images which form one scene as one unit.

The region 74 displays the input sheet, and is used to append meta data to the image (sub-data) displayed on the lower portion 732 of the region 73.

A combo box 741 is used to select the type of event of the generic concept, which can be selected from a plurality of types of events in a pull-down menu format. After this event is selected, other input items in the region 74 can be selected. In FIG. 7, the event "wedding reception" is selected.

A region 742 is used to select events as specific concepts of the event selected using the combo box 741, and lists a plurality of events which are set in advance as those which form the event "wedding reception". The user can arbitrarily select an event corresponding to the contents of the selected sub-data, and other input items in the region 74 can be further selected upon selecting the event. In FIG. 7, an event "lighted-up bridal couple" is selected.

A region 743 displays input items which are determined in advance in accordance with meta data candidates set for the event selected on the region 742. In FIG. 7, names of objects which may appear in the event selected in the region 742 are listed. When the user selects/non-selects these objects, he or she can designate the names of the objects which appear in the currently selected sub-data, and can append meta data associated with persons/articles that appear in the scene by a simple operation. In FIG. 7, the user designates a state wherein "bridegroom" and "bride" appear but no "cake" appears in the region 732.

When the user presses a "detailed information" button in the region 743, further detailed information can be appended to these objects. The contents that can be appended as the detailed information include add/delete/change of various attributes to individual objects, add/delete/change of persons/articles which are not specified as input items, and the like, so that the user can arbitrarily edit or set meta data candidates.

A region 744 also displays input items which are determined in accordance with meta data candidates set for the event selected on the region 742 as in the region 743. In FIG.

7, items associated with relations among objets, situations, and the like are listed. When the user selects/non-selects these items, he or she can designate the relations or situations present in the currently selected scene, and can append meta data of the relations and situations of persons/articles which appear in the scene by a simple operation. In FIG. 7, the user designates a state wherein the scene does not include "laugh" but includes "closeup of face", "camera flash", and "applause". Upon pressing a "detailed information" button in this region, further detailed contents of the relations and situations can be appended.

The contents that can be appended as the detailed information include add/delete/change and the like of attributes of the relations and situations, set/change/delete and the like of objects such as acting persons (articles) and target persons (articles) and the like of the relations, and add/delete/change and the like of relations and situations which are not included in the events or event template, and the like, so that the user can arbitrarily edit and set meta data candidates.

A region 745 displays input items such as a keyword, comment, and the like to be arbitrarily appended to the currently selected sub-data. In FIG. 7, some comments have been appended, and a comment "bride almost tumbled" is selected. By pressing a "delete" button, the selected comment can be deleted. By pressing an "add" button, a new keyword or comment can be added. Note that the keyword and comment may be arbitrarily input by the user, or the system may pre-set appropriate keywords, comments, and the like as meta data candidates, and may prompt the user to select them.

A region 75 is used to finally instruct to append the meta data input to the region 74 to the currently selected sub-data. Upon pressing a "registration" button, the contents input to the region 74 indicating the input sheet are settled as meta data, and a process for saving such data starts. Upon pressing a "cancel" button, the contents input to the region 74 indicating the input sheet are discarded.

In this way, the user can input meta data for each scene of a moving image. In the example shown in FIG. 7, meta data are appended to one scene of a moving image. However, the present invention is not limited to such specific data to which meta data is to be appended, and meta data can be appended to various multimedia contents in the same sequence.

Referring back to FIG. 6, the selected data and input meta data are saved in association with each other in step S3. In the aforementioned example in FIG. 7, information input to the region 74 indicating the input sheet is appended as meta data to the sub-data of the image displayed on the region 732, and the meta data is saved in the storage medium such as the DISK and the like in FIG. 1 in association with the sub-data.

Figure 8:
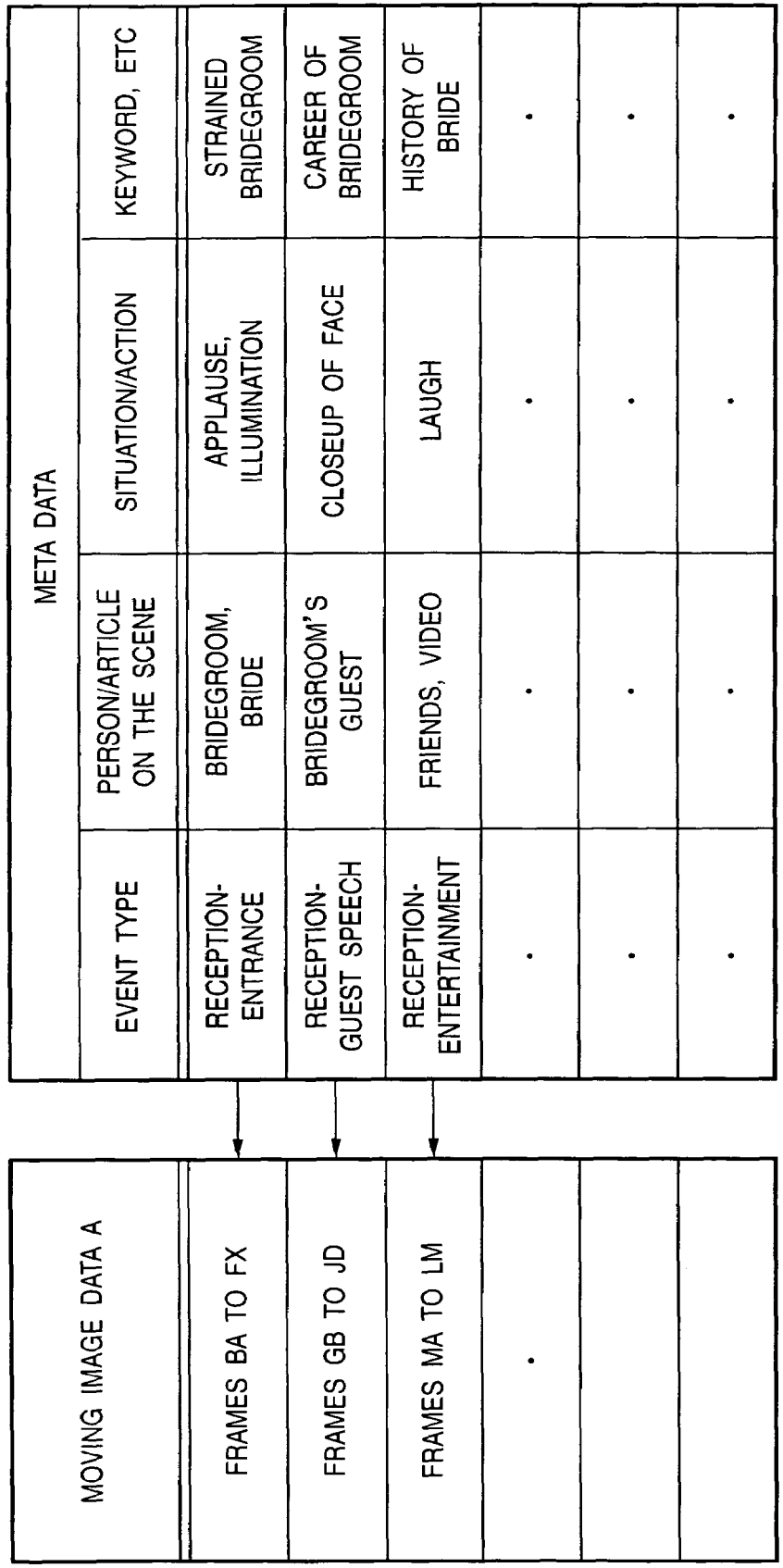
FIG. 8 shows a table that indicates the relationship between data and meta data appended thereto.

FIG. 8 is a table showing the relationship between data and meta data appended thereto, and shows that the types of events and input ones of meta data candidates are appended as meta data to each of a plurality of groups of frames included in moving image data A. In FIG. 8, text information or the like which can be used as a simple keyword is mainly stored. Also, information other than text such as information having a given structure (e.g., the relationship between persons on the scene) can be appended.

Index information indicating data associated with each meta data is generated or updated so as to be used in a search. FIG. 9 shows an example of index information, and shows data associated with meta data in the form of a table. This index information is saved in a storage medium such as the DISK or the like in FIG. 1.

<Data Search Process>

An example of the processing upon making a data search on the basis of meta data appended to each data in the data management system of this embodiment will be explained below.

Upon making a search, the user inputs a search condition, which is compared with meta data appended to each data in the aforementioned sequence, and data or sub-data to which meta data that matches the search condition is appended is picked up using the index information or the like shown in FIG. 9.

Figure 10:
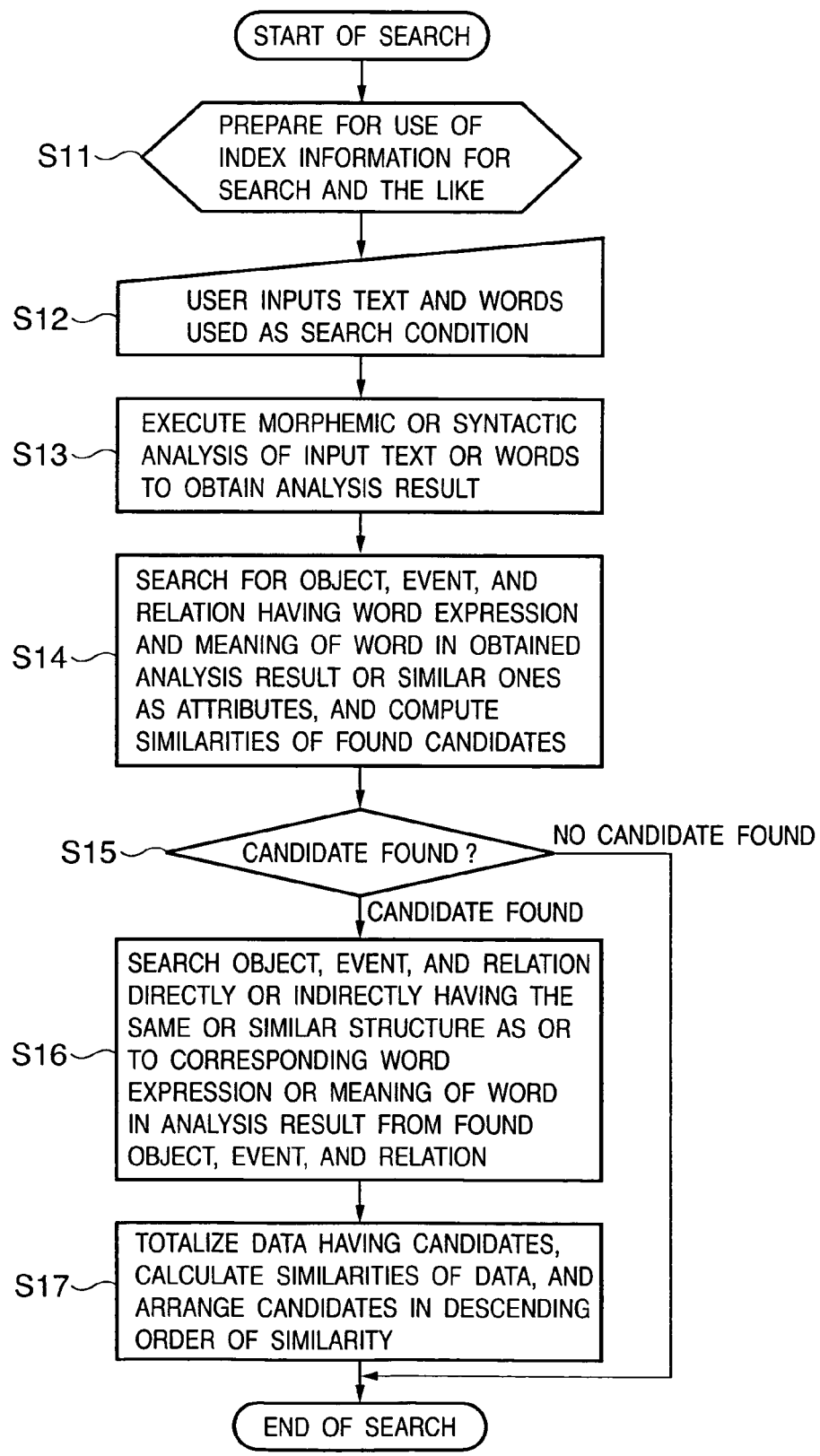
FIG. 10 is a flow chart showing the data search process.

An example of a data search will be explained below. FIG. 10 is a flow chart of such data search process.

In step S11, data are processed on the RAM in FIG. 1 to allow this data management system to use index information for search and the like. Note that data to be searched, its meta data, and the like can be held on a computer such as the PC on the LAN via the NCU in FIG. 1 or a computer on an external network via the DTU.

In the process in step S12, the user inputs text or words used as a search condition. Note that the user can input from the KB in FIG. 1 natural text that expresses an event to be searched as a search condition. The search condition may be accepted by, e.g., the PC in FIG. 1, and may be input via the LAN.

A case will be exemplified below wherein text "closeup of Mr. & Mrs. Tanaka" is input as a search condition.

In step S13, the text and words input as the search condition undergo morphemic or syntactic analysis using a natural language processing technique. As such analysis techniques or schemes, various known schemes may be used. However, the present invention is not limited to a specific scheme as long as text can be divided into a set of semantic words, and information such as parts of speech, meanings, and the like of words, and information associated with the relation of these words in the text can be extracted.

Figure 11:
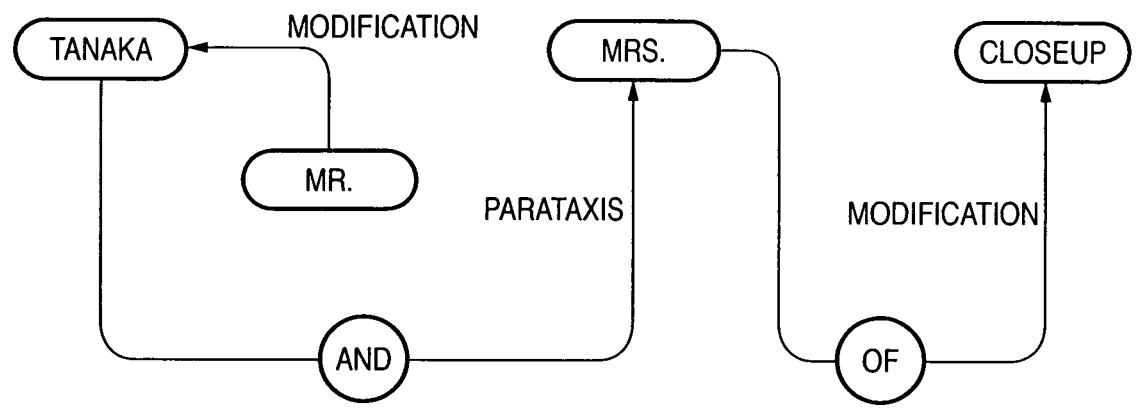
FIG. 11 shows an example of a morphemic or syntactic analysis result of "closeup of Mr. & Mrs. Tanaka" as an example of a search condition.

FIG. 11 shows a morphemic or syntactic analysis result of the search condition "closeup of Mr. & Mrs. Tanaka". This text is decomposed into words "Tanaka", "Mrs.", "and", and the like, and information of a part of speech such as "noun", "conjunction", or the like is assigned to each word. In the analysis result, these words have relations such as "modification", "parataxis", and the like.

In the process in step S14, a data search is made on the basis of the analysis result obtained in step S13 and correlation among the events, meta data candidates, and the like in the template shown in FIG. 5.

In this case, objects and events indicated by important words having parts of speech such as noun or the like in the analysis result in FIG. 11, and their relations are searched, and the similarity of a combination of a given word and corresponding object or event is calculated.

In this example, for example, assume that a bridegroom has an attribute "Tanaka" as a name, and a bride has an attribute "Mrs." as another name. Also, some events having an attribute "closeup" itself as an event state or having the same meaning are present.

Then, these are picked up as search results, and similarities are calculated based on similar degrees of meanings of words, and attributes of events, objects, and relations. Note that the similarity is a value indicating a degree of appropriateness of a specific word in text input by the user as an expression indicating each object, event, or relation.

In step S15, the flow branches depending on as to whether or not candidates of objects, events, relations, and the like searched in step S14 are found. If no candidate is found, the search ends with "no candidate". If at least one candidate is found, the flow advances to step S16.

In step S16, objects, events, relations, and the like as candidates have a structure similar to the relations of words shown in FIG. 11, and such structure is added as a preferential candidate. In the example of FIG. 11, since "Tanaka" and "Mrs." are connected via a parataxis relation, and "Mrs." and "closeup" are connected via a modification relation, scenes containing closeup shots of the faces of the bridegroom and bride ("bridegroom"—"face" (partial/overall relation), "bride"—"face" (partial/overall relation)) have a situation "closeup", and their subjects are "face".

In this way, a similar structure is indirectly found from an event having an object found by "Tanaka" and a situation "closeup", and an event having an object found by "Mrs." and a situation "closeup". Therefore, data or sub-data associated with such events are added as candidates.

In step S17, similarities between respective data and search condition are calculated on the basis of the similarities of structures found in step S16, information of similarities of words calculated in step S14, and the like, and the data are listed in descending order of similarity.

In this way, the search process is completed, and one or a plurality of data or sub-data, and their similarities to the text input by the user are obtained. The search ends.

Figure 13:
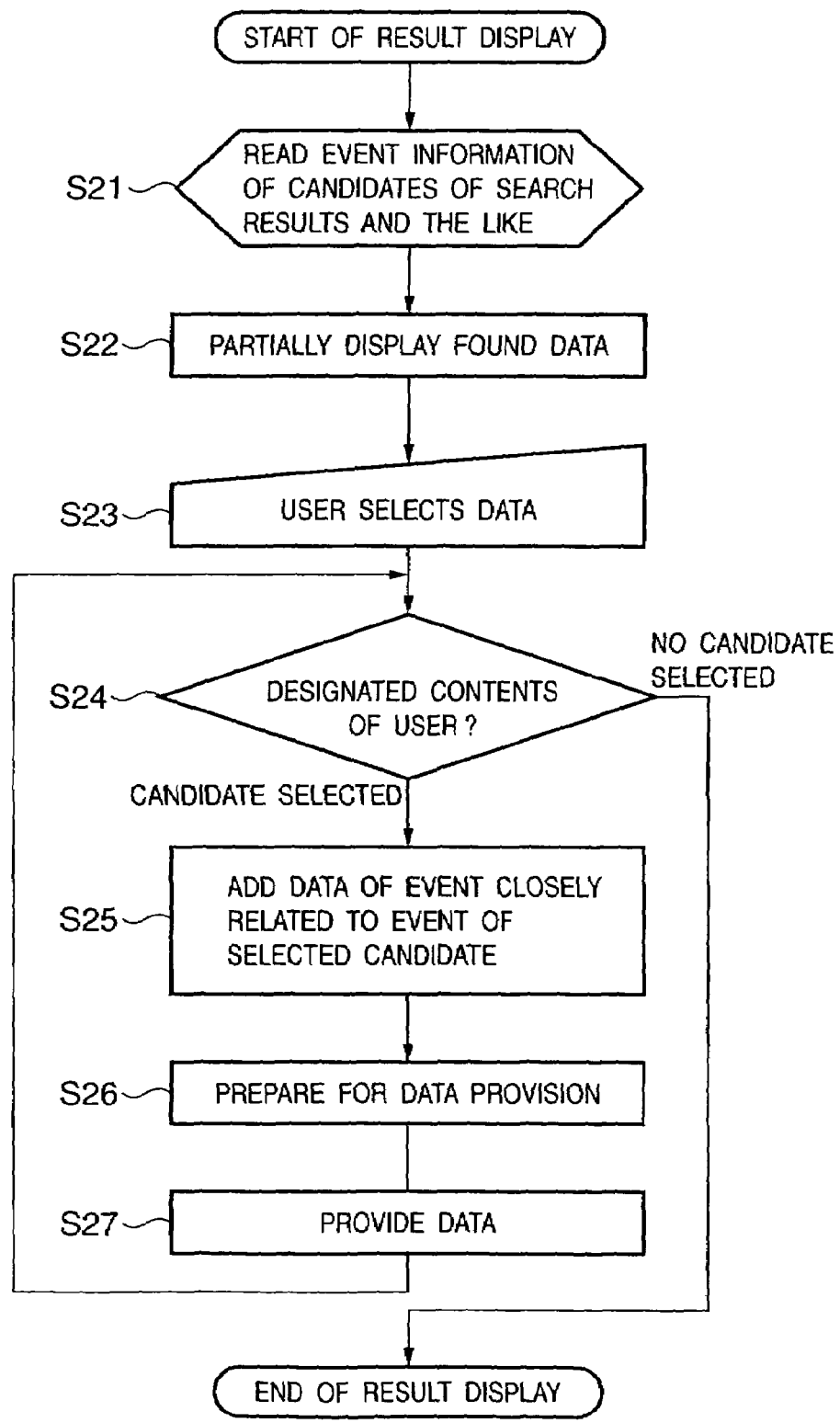
FIG. 13 is a flow chart showing the search result display process.

The process for presenting the search results obtained by the process in FIG. 10 in an easy-to-understand form will be explained below. With the process to be described below, search results can be provided to the user in an easy-to-understand form. FIG. 13 is a flow chart showing the display process of the search results.

In step S21, various pre-processes are executed so that the search results obtained by the process in FIG. 10, and information such as templates indicating correlation among events and the like associated with data as the search results can be used on the DISK and RAM.

In step S22, data candidates found by the search process in FIG. 10 are presented to the user. If a plurality of data candidates are found by the search process, or the entire moving image is picked up as a data candidate, since the user may want only partial data or image, the data candidates found by search are preferably inspected by the user in practice by some method to select desired data. In this embodiment, data candidates are displayed as still images, comments, and the like of representative portions of scenes in the data. In this way, the user can obtain information such as the number of candidates, brief features of candidates, and the like.

In step S23, the user actually selects data from the data candidates presented in step S22. In the process in step S24, the selection result is discriminated. If a candidate is selected, the flow advances to step S25; otherwise, the flow ends.

In step S25, the contents of the selected candidate are inspected by the user to confirm if the user selected desired data, and to allow the user to select data closer to desired one. Hence, not only data as candidates found by search, but also events which have strong relations to events to which these data belong are examined on the basis of the relations among events in the template or the like in FIG. 5, and if data which belong to such events are found, they are added to a displayed candidate list.

Only when contents match constraints and conditions associated with the user's environment and circumstance, which are designated in advance by the user, a candidate is added. Note that the constraints and conditions associated with the user's environment and circumstance include a constraint imposed by the user's device & network environment, a time constraint, i.e., if the user has a sufficient time margin upon observing the search result, a constraint and condition imposed by the amount of charge, copyrights, and ethical limitations, and the like, but are not particularly limited as long as they can impose limitations or constraints.

In step S26, preparation for providing the contents of the data of user's choice, and data added in step S25 is made. For example, if data are moving images, these data are arranged on the basis of the relations of events, so that they can be played back as a series of moving images.

In step S27, the data prepared in step S26 are provided to the user. For example, if data are moving images, these data are played back and displayed. Upon completion of provision of the data, the flow returns to step S24 so that the user can observe another candidate.

With such process order, when the user selects a desired portion of multimedia contents, he or she can also observe portions closely related to that portion at the same time. Hence, the user can easily understand a portion which seems to be a desired portion, and can know portions other than the portions found by search of the multimedia contents required for understanding the contents.

In this manner, this embodiment can easily append meta data to various data of multimedia contents and the like, and allows easy search and easy understanding of the search results using the meta data. At the same time, since many meta data are appended due to easy appending of meta data, search precision can be improved, and the user can easily and effectively use a data search.

In the template shown in FIG. 5, when events having similar contents or structures in the template are derived from a specific event class by utilizing object-oriented features, the template creator or user can easily create events.

Figure 12:
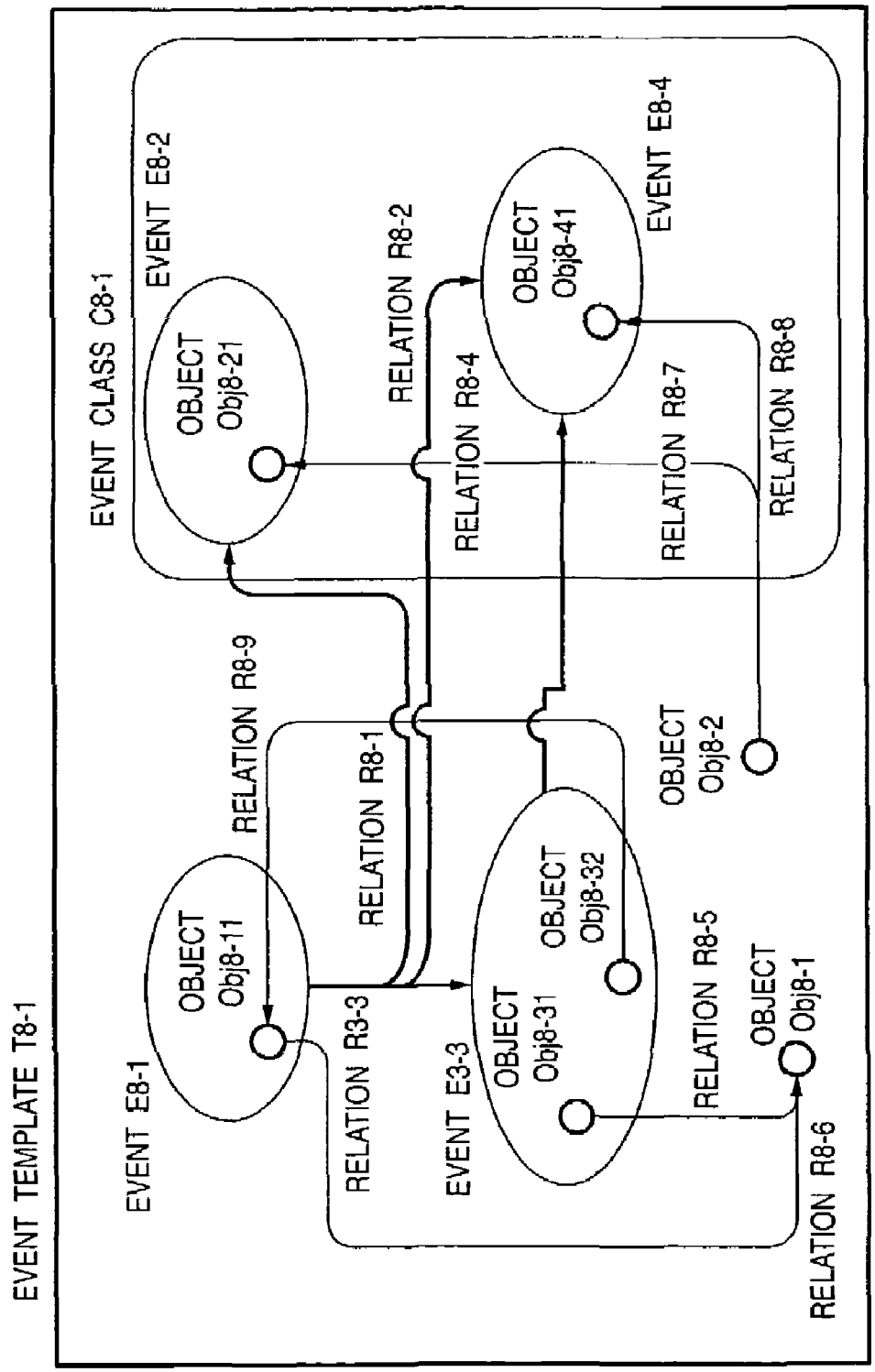

FIG. 12 shows this process. In FIG. 12, T8-X (X=numerals) represents a template; E8-X (X=numerals), events; Obj8-X (X=numerals), objects; and R8-X (X=numerals), relations, as in FIG. 5.

In this case, a portion common to a plurality of events is declared as an event class, only a difference from this class is described in the self event, and the common portion is derived from the event class, thus omitting a description of the common portion. In FIG. 12, events E8-2 and E8-4 are derived from event class C8-1, and succeed objects, relations, and the like in this event class C8-1.

<Other Examples of Meta Data Appending Process>

Other examples of the meta data appending process explained with reference to FIG. 6 will be described.

<Meta Data Appending Process (Part 2)>

In the above embodiment, after information such as a moving image or the like to which meta data are to be appended is generated, meta data are appended. Alternatively, meta data may be set first, and may be appended to data input after that setting process. For example, meta data is appended in advance to an image to be captured by a video camera or digital camera. In this case, meta data is appended to image data, and an image sensing device such as a CCD sensor or the like serves as a data input device.

In this case, the image sensing device for inputting data to which meta data is to be appended may be added to the hardware arrangement of the computer apparatus described previously with reference to FIG. 1. Also, meta data may be appended on an electronic device such as a video camera, digital camera, or the like that captures an image.

When meta data is appended on the electronic device, the aforementioned data management system can be built using an electronic device such as a video camera, digital camera, or the like, which comprises a hardware arrangement equivalent to that of the computer apparatus described with reference to FIG. 1. The following explanation will be given assuming that such electronic device is used.

As described above, the detailed contents of data, persons on the scene, situations, and the like can be predicted to some extent from our experience. Therefore, upon appending meta data to each data in the aforementioned electronic device, a meta data input sheet that presents meta data candidates for respective events is presented to the user to input data.

In such case, storage devices such as the DISK, ROM, RAM, memory card, and the like of the electronic device store information which define the relations among events shown in FIG. 3, and information of meta data candidates shown in FIG. 4. Such information may be acquired from, e.g., the LAN, and may be stored in these storage device when the information is used.

The electronic device preferably comprises a display unit which is large enough to display the meta data input sheet. For example, when meta data is appended to moving image data, the meta data input sheet stored in the electronic device such as a video camera, digital camera, or the like is displayed on the display unit of the electronic device such as a video camera, digital camera, or the like, and the user inputs data from a console of the electronic device. The input meta data and moving image data are saved in the storage device of the electronic device in association with each other, and can be used in, e.g., a search.

Note that the saved data can be added/changed using the data management system built on the computer apparatus shown in FIG. 1. In such case, the storage device of the data management system used in the add/change process preferably stores the same input sheet as that stored in the storage device of the electronic device such as a video camera or the like.

Figure 14:
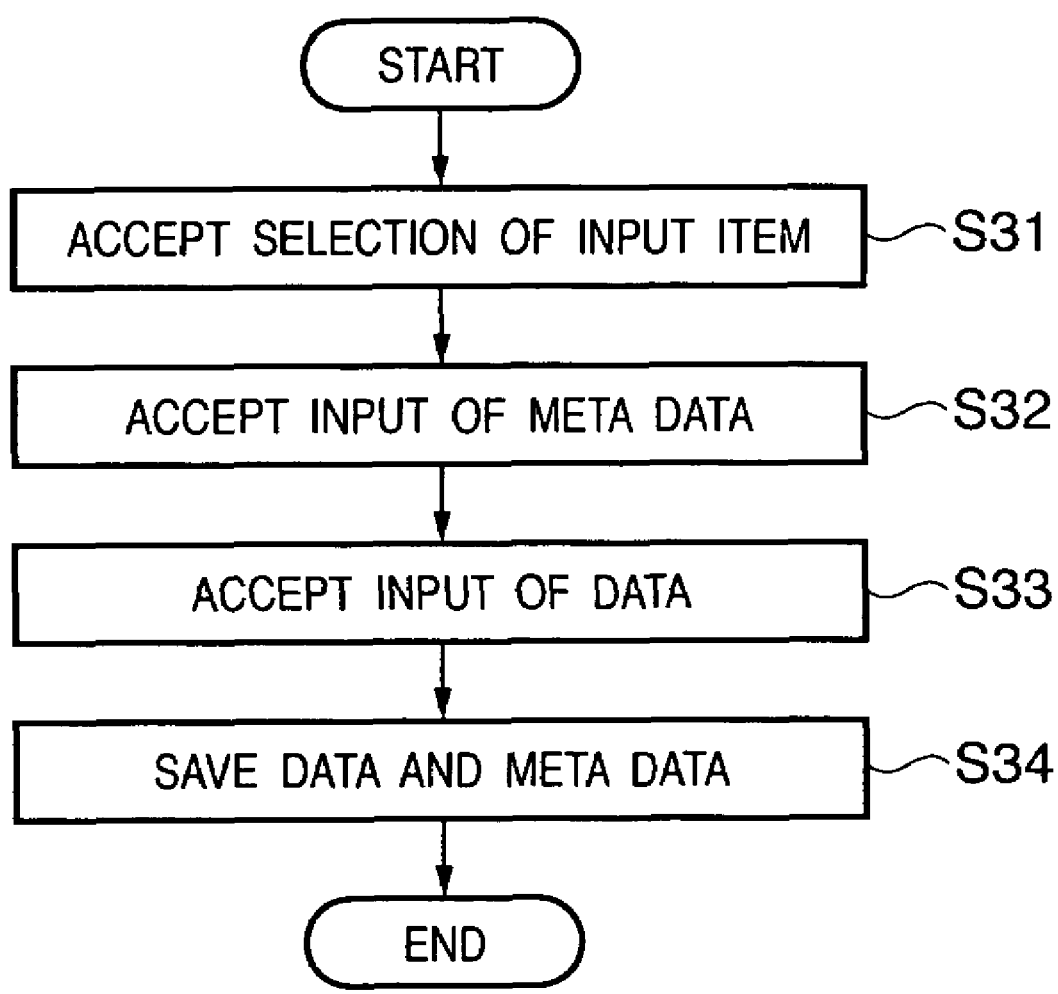
FIG. 14 is a flow chart showing the flow of the meta data appending process (part 2)

The meta data appending process done on the electronic device will be explained below using a practical example. FIG. 14 is a flow chart showing the flow of the meta data appending process.

In step S31, the electronic device such as a video camera or the like accepts selection of input items of the input sheet with respect to data to be input. The input sheet is stored in, e.g., the storage device of the electronic device. The input items of the input sheet are displayed on the display unit of the electronic device in the form of a list, and the user can select them by inputs using buttons and the like on the console. When the input sheet is selected, the electronic device displays the selected input sheet on the display unit.

Figure 16:
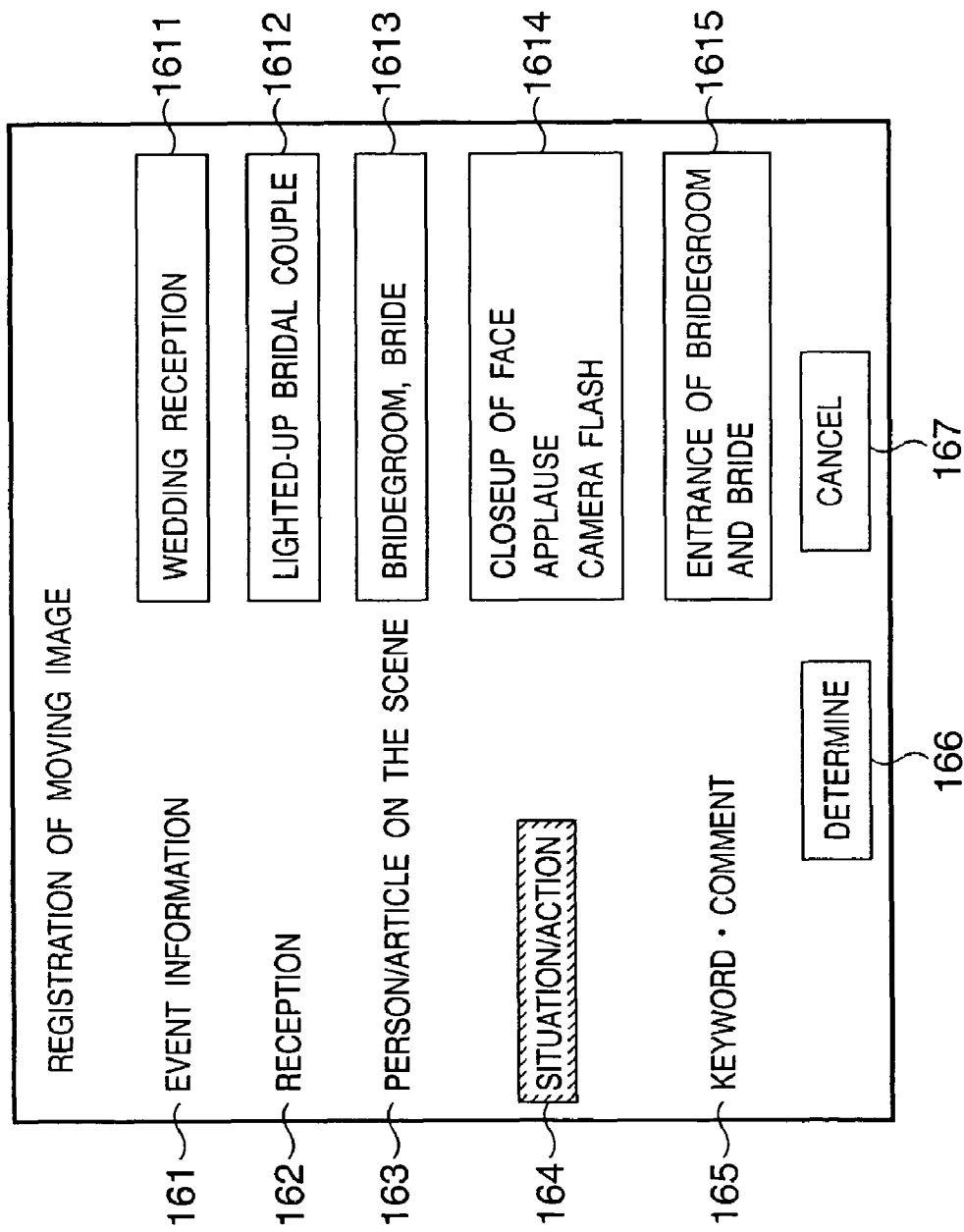
FIG. 16 shows a display example on a display unit upon appending meta data.

An example of the process in step S31 will be explained below. FIG. 16 shows a display example on the display unit of the electronic device upon inputting meta data. This screen shows the meta data input sheet, i.e., a display example upon appending meta data to some frame image or a group of successive frame images (sub-data) of a video to be captured. Note that the display example of FIG. 16 exemplifies a case wherein a wedding reception is to be captured, and meta data is appended to sub-data indicating some frame images or a group of successive frame images.

The user can select input items 161 to 165 by inputs using buttons and the like on the console. Upon selecting the input items 161 to 165, the user presses a predetermined button to highlight display of an item name of one of the input items 161 to 165, and then presses a button for instructing selection in such state, thus selecting that item.

Upon selecting the item, the screen is switched to a page for inputting individual contents, and the user can append meta data for each input item to data. When the user presses a selection button while the item 164 "situation/action" is highlighted in FIG. 16, he or she designates input of the contents associated with the relations among objects, situations, and the like, and a screen that lists items associated with the relations among objects, situations, and the like is displayed.

The contents input by the user are displayed on fields 1611 to 1615 in FIG. 16. FIG. 16 illustrates a state wherein all the items 161 to 165 have entries.

The item 161 "event information" is used to select the type of event of the generic concept. Upon selecting this item, the screen is switched to a page that displays a list of events. The user can select an event corresponding to the data contents from a plurality of types of events using a predetermined button. The event of user's choice is displayed on the field 1611. After this event is selected, other input items can be selected. In FIG. 16, an event "wedding reception" is selected.

Figure 17:
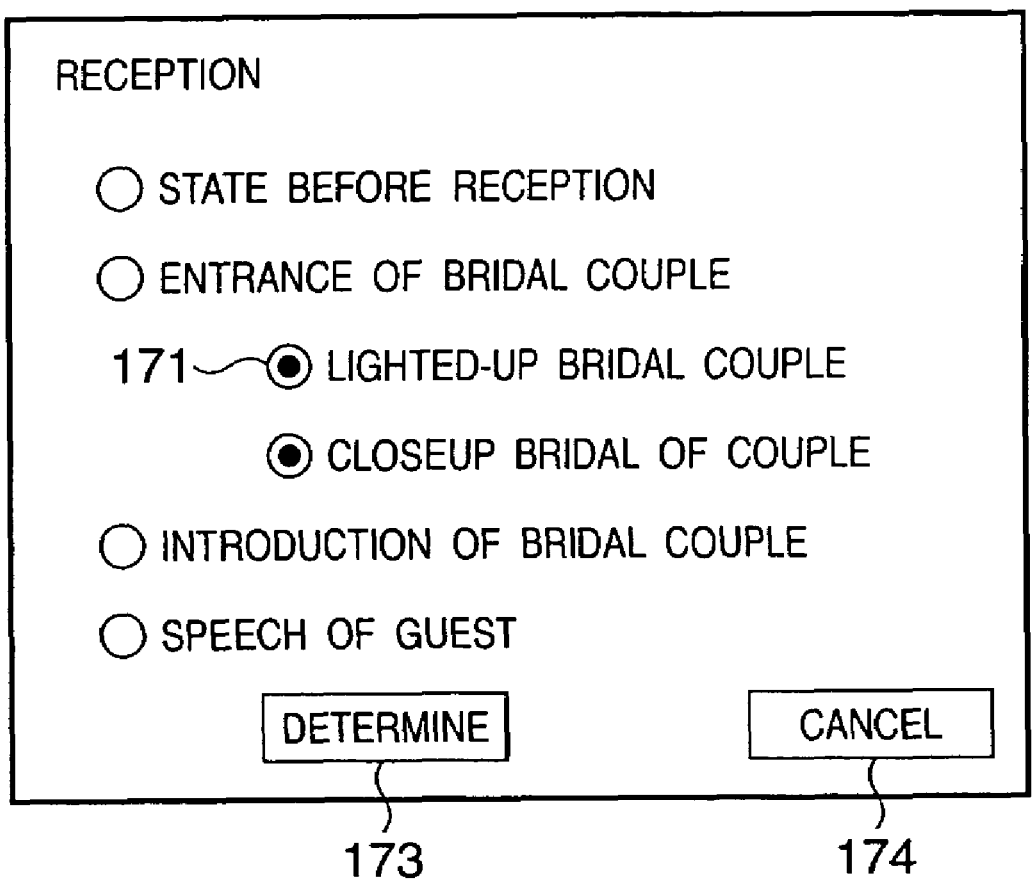
FIG. 17 shows a display example on the display unit upon appending meta data.

The item 162 "reception" is used to select events of specific contents of the selected event. Upon selecting this item, a screen page that lists a plurality of events pre-set as those which form the event "wedding reception" is displayed. FIG. 17 shows a display example of that page. By selecting/non-selecting items displayed in the list, the user can arbitrarily select events corresponding to the contents of data to be input by a simple operation. In FIG. 17, an item of a radio button 171 is selected.

When the user selects a determination button 173, the screen page shown in FIG. 16 is displayed again, and the event of his or her choice is displayed on the field 1612. A cancel button 174 is used to cancel selection.

Upon selecting the event, other input items in FIG. 16 can be further selected. In FIGS. 16 and 17, an event "lighted-up bridal couple" is selected as a specific event of "wedding reception".

Referring back to FIG. 14, the electronic device accepts meta data input to the input sheet in step S32. The user can input meta data using buttons and the like on the console in accordance with input items listed on the input sheet.

Note that "input" is a broad concept including a case wherein character strings such as YES/NO, detailed keywords, and the like are input to the presented input items, and a case wherein one of presented choices is selected.

The process in step S32 will be explained in detail below using FIG. 16.

The item 163 "person/article on the scene" is used to select input items determined according to meta data candidates set for the event selected by the input item 162. Upon selecting this item, a screen page that lists names of objects which may appear in the event selected by the input item 162 is displayed. By selecting/non-selecting these names, the user can designate objects which appear in the image of the data, and can append meta data to persons or articles on the scene by a simple operation.

The objects of user's choice are displayed on the field 1613. In FIG. 16, the user assumes that "bridegroom" and "bride" will appear in a video to be captured.

When a button "detailed information" is selected on the screen that lists the names of objects, further detailed information can be appended to each object. The contents that can be appended as the detailed information include add/delete/change of various attributes to individual objects, add/delete/change of persons/articles which are not specified as input items, and the like, so that the user can arbitrarily edit or set meta data candidates.

Figure 18:
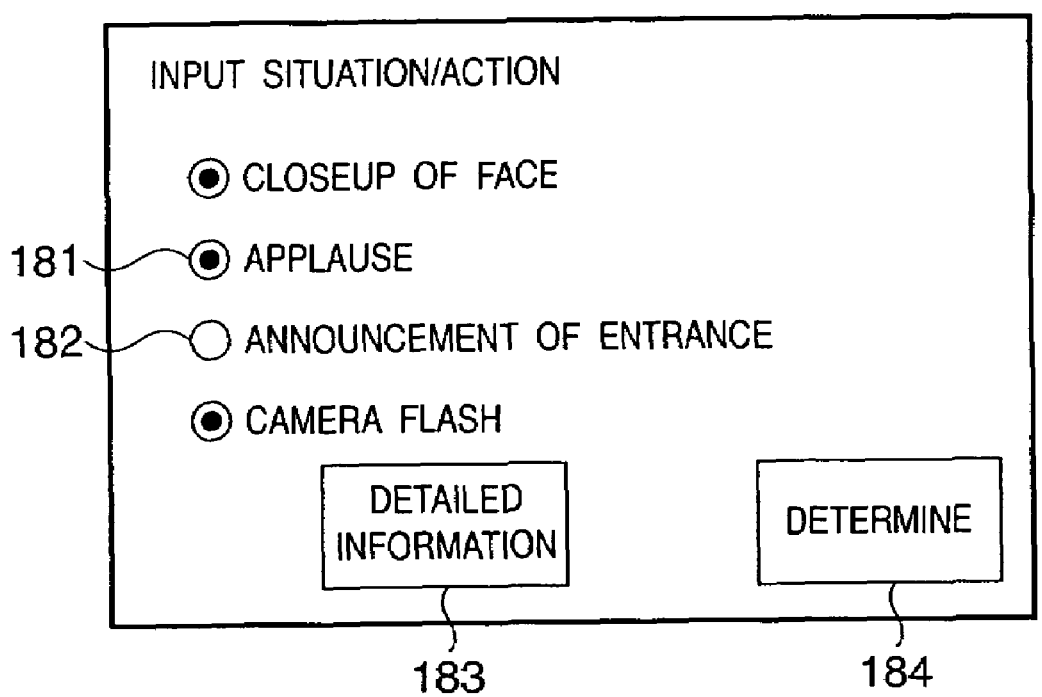
FIG. 18 shows a display example on the display unit upon appending meta data.

The item 164 "situation/action" is also used to select input items determined according to meta data candidates set for the event selected by the input item 162 as in the input item 163. Upon selecting this item, a screen page that lists items associated with the relations among objects, situations, and the like is displayed. FIG. 18 shows a display example of that page.

In the display example in FIG. 18, an item 181 "applause" is selected, and an item 182 "announce of entrance" is not selected. Also, "closeup of face" and "camera flash" are selected. By selecting/non-selecting these items, the user can designate the relations or situations present in the scene, and can append meta data of the relations and situations of persons/articles which appear in the scene by a simple operation. Upon selecting a detailed information button 183, further detailed contents can be appended in association with the relation or situation.

The contents that can be appended as the detailed information include add/delete/change and the like of attributes of the relations and situations, set/change/delete and the like of objects such as acting persons (articles) and target persons (articles) and the like of the relations, and add/delete/change and the like of relations and situations which are not included in the events or event template, and the like, so that the user can arbitrarily edit and set meta data candidates.

Upon selecting a determination button 184, the screen page shown in FIG. 16 is displayed again, and the relations among objects, situations, and the like of user's choice are displayed on the field 1614.

Figure 19:
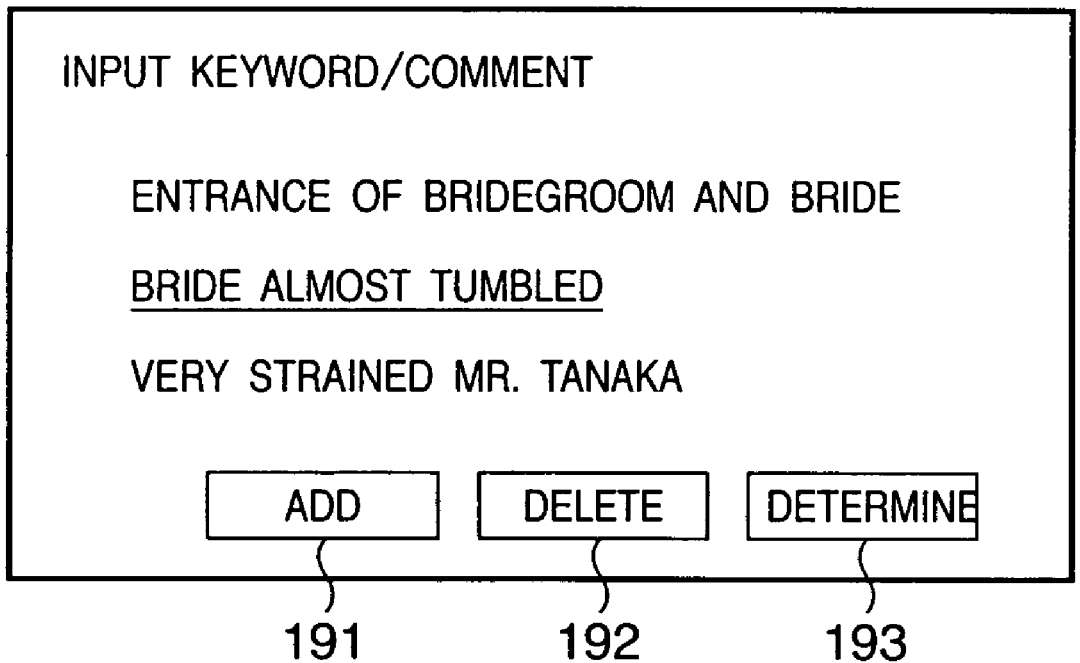
FIG. 19 shows a display example on the display unit upon appending meta data.

The item 165 "keyword/comment" is an input item for appending keywords and comments to data. Upon selecting this item, a screen page for arbitrarily appending keywords and comments is displayed. FIG. 19 shows a display example of that page. In FIG. 19, some comments have been appended, and a comment "bride almost tumbled" is selected.

By pressing a delete button 192, the selected comment can be deleted. By pressing an add button 191, a new keyword or comment can be added. Note that the keyword and comment may be arbitrarily input by the user, or the system may pre-set appropriate keywords, comments, and the like as meta data candidates, and may prompt the user to select them. Upon selecting a determination button 193, the screen page shown in FIG. 16 is displayed again, and the keywords and comments input by the user are displayed on the field 1615.

Upon completion of input of respective items to the data, the user finally instructs to append input meta data to data. When a determination button 166 is selected, the input contents are settled as meta data, and are saved. When a cancel button 167 is selected, the input contents are discarded.

In this way, the user can input meta data for respective scenes of a moving image. In the example shown in FIG. 16, meta data are appended to one scene of a moving image. However, the present invention is not limited to such specific data to which meta data is to be appended, and meta data can be appended to various multimedia contents in the same sequence.

Referring back to FIG. 14, data to which meta data input and set in steps S31 and S32 are to be appended is input in step S33. For example, image data is generated by capturing an image, and is input.

Note that data can be input in units of partial data (sub-data) that form each data like each frame image or a group of successive frame images in moving image data. When data is input, the electronic device displays the input data on the display unit, and the user can confirm the input data.

In step S34, the data input in step S33, and meta data input and set in steps S31 and 32 are saved in association with each other. In the example of FIG. 16, various kinds of information input to the fields 1611 to 1615 in FIG. 16 are appended as meta data to sub-data of the image input in step S33, and the meta data are saved in the storage medium or the like of the electronic device in association with the sub-data.

The saved data can be used in, e.g., a search. The process upon making a search based on meta data appended to input data can be done in the same manner as that described above in the paragraphs of <data search process>.

The data saved in step S34 can be loaded onto the system using the computer apparatus shown in FIG. 1, and can be added/changed. In this case, when the data are stored in a detachable storage medium such as a floppy disk, memory card, or the like, the computer apparatus can refer to those data. Also, the data can be shared by connecting the computer apparatus and electronic device via a LAN, large-scale network, or interface such as IEEE1394 or the like.

<Meta Data Appending Process (Part 3)>

In the aforementioned meta data appending process (part 2), meta data is appended on the electronic device such as a video camera or the like. In order to append further detailed meta data, the data management system using the computer apparatus shown in FIG. 1 can be used.

In this case, storage devices such as the DISK, ROM, RAM, memory card, and the like of the electronic device store information which define the relations among events shown in FIG. 3, and the storage device of the computer apparatus stores information of meta data candidates for these events (FIG. 4). Such information may be acquired from, e.g., the LAN, and may be stored in these storage device when the information is used.

For example, upon appending meta data to moving image data, the input sheet associated with events stored in the electronic device such as a video camera, digital camera, or the like is displayed on the display unit of the electronic device before video capture, and the user inputs data at the console. After that, the user inputs moving image data, and the input moving image data and events are saved in the storage device of the electronic device in association with each other.

Furthermore, detailed meta data are appended to the moving image data using the meta data input sheet stored in the storage device of the computer apparatus. Note that the data appended with the meta data can be used in, e.g., the aforementioned search process after it is saved.

Figure 15:
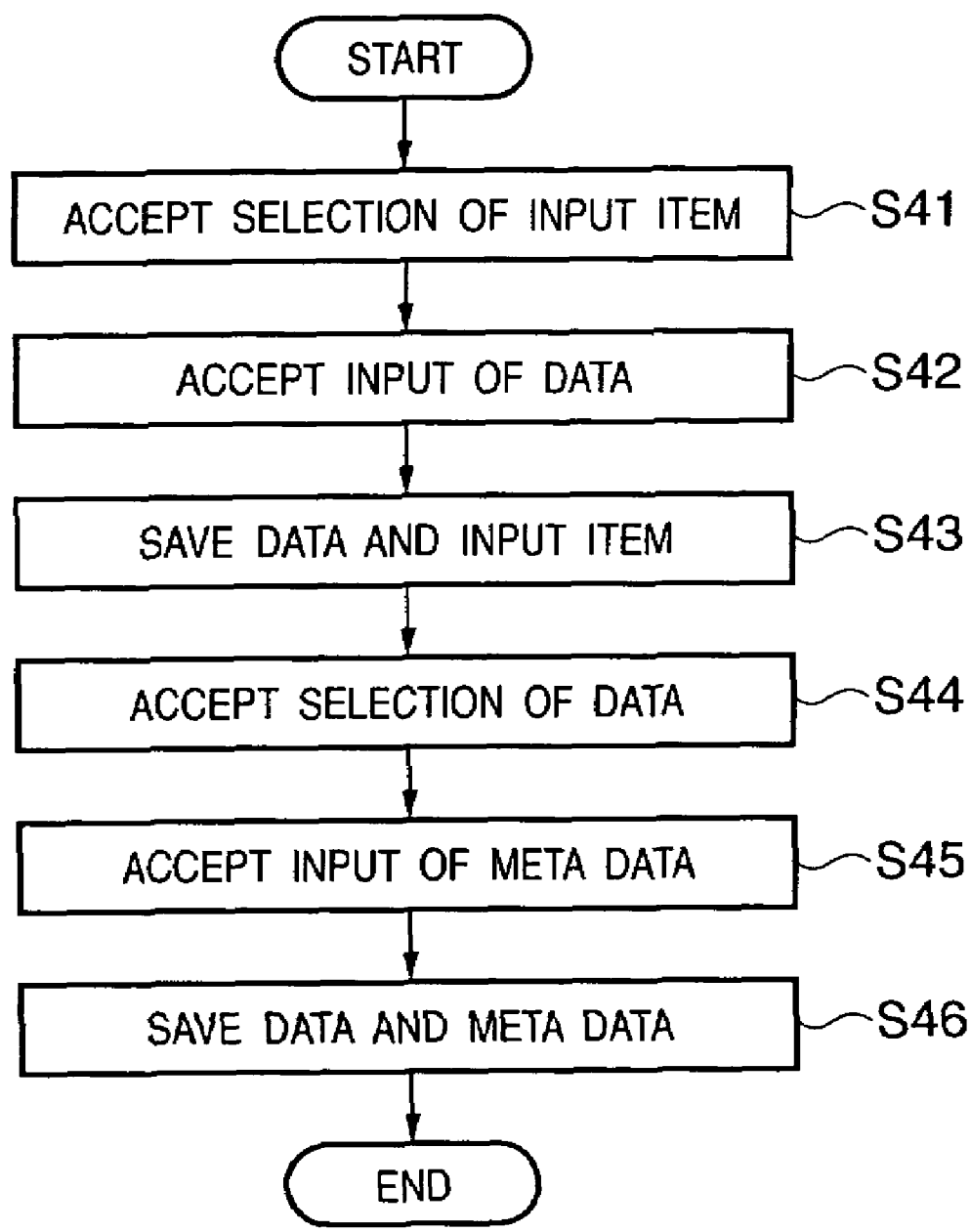
FIG. 15 is a flow chart showing the flow of the meta data appending process (part 3)

FIG. 15 is a flow chart showing the flow of such process.

In step S41, the electronic device accepts selection of input items of the meta data input sheet with respect to data to be input. The input sheet is stored in, e.g., the storage device of the electronic device. The input items of the input sheet are displayed on the display unit of the electronic device in the form of a list, and the user can select them by inputs using buttons and the like on the console. When the input sheet is selected, the electronic device displays the selected input sheet on the display unit.

The process in step S41 will be explained below using an example.

FIG. 20 shows a display example upon selecting input items of meta data. This display screen shows an input sheet, i.e., a display example upon appending meta data to some frame image or a group of successive frame images (sub-data) of a video to be captured.

FIG. 20 shows an example upon capturing the wedding reception, and assumes a case wherein input items of meta data are selected for sub-data indicating some frame images or a group of successive frame images.

The user can select input items 201 and 202 by inputs using buttons and the like on the console provided to the electronic device.

Upon selecting an item, the screen is switched to a page for inputting individual contents, and the user can select an input item of meta data for data. In FIG. 20, the item name of the item 201 "event information" is highlighted. Upon pressing a selection button in this state, the user designates input of an event of the generic concept, and a screen page that lists items of available events is displayed.

The contents input by the user are displayed on fields 2011 and 2012 in FIG. 20. FIG. 20 shows a state wherein both the input items 201 and 202 have entries.

The item 201 "event information" is used to select the type of event of the generic concept. Upon selecting this item, the screen is switched to a page that displays a list of events, and the user can select an event corresponding to the contents of data from a plurality of types of events. The event of user's choice is displayed on the field 2011. After this event is selected, other input items can be selected. In FIG. 20, an event "wedding reception" is selected.

The item 202 "reception" is used to select events of specific contents of the event selected by the item 201 "event information". Upon selecting this item, a screen page that lists a plurality of events pre-set as those which form the event "wedding reception" is displayed (e.g., a display example of FIG. 17). In the example of FIG. 20, an event "lighted-up bridal couple" is selected as a specific event of "wedding reception" (field 2012).

In this way, the user can select input items of meta data for respective scenes of a moving image.

Referring back to FIG. 15, data corresponding to the input items selected in step S41 is input in step S42. Note that data can be input in units of partial data (sub-data) that form each data like each frame image or a group of successive frame images in moving image data. When data is input, the electronic device displays the input data on the display unit, and the user can confirm the input data.

In step S43, the input items selected in step S41, and data input in step S42 are saved in association with each other. In the example of FIG. 20, a plurality of pieces of information input to the fields 2011 and 2012 are selected and saved as input items for the sub-data of the image input in step S42. The aforementioned processes are done by the electronic device.

A process for appending further detailed meta data to the data saved in step S43 is executed using the computer apparatus or the like shown in FIG. 1. When the data saved in step S43 are stored in a detachable storage medium such as a floppy disk, memory card, or the like, the computer apparatus can refer to those data. Also, the data can be shared by connecting the computer apparatus and electronic device via a LAN, large-scale network, or interface such as IEEE1394 or the like.

In step S44, the computer apparatus accepts selection of data to which meta data are to be appended. The data are displayed on the CRT in the form of, e.g., a list, and the user can select data from the KB. After the data is selected, the data management system displays the selected data and an input sheet of meta data corresponding to events associated with the selected data on the CRT. Input items of the input sheet are displayed on the CRT in the form of, e.g., a list, and the user selects them from the KB.

In step S45, the computer apparatus accepts input of meta data to the input sheet. The user can input meta data from the KB in accordance with the input items listed on the input sheet. Note that "input" is a broad concept including a case wherein character strings such as YES/NO, detailed keywords, and the like are input to the presented input items, and a case wherein one of presented choices is selected.

Note that the processes of steps S44 and S45 can be done in the same manner as that described above with reference to FIG. 7. In FIG. 7, when data is selected, the selected data is displayed on the rectangular region 73 bounded by the bold line, and the input sheet associated with the selected data is displayed on the inverted-L-shaped region 74 bounded by the bold line.

In step S46, the selected data and input meta data are saved in association with each other. As in the example of FIG. 7, information input to the region 74 that displays the input sheet is appended to sub-data of the image displayed on the region 732, and that meta data is saved in the storage medium such as the DISK or the like in FIG. 1 in association with the sub-data. The saved data can be used in, e.g., a search. The process upon making a search based on meta data can be done in the same manner as that described above in the paragraphs of <data search process>.

The preferred embodiment of the present invention has been described. The objects of the present invention are also achieved by supplying a program code of a software program that can implement the functions of the above-mentioned embodiments, a program product such as a storage medium which records the program code, or the like to the system or apparatus, and reading out and executing the program code stored in the storage medium by a computer (or a CPU or MPU) of a system or apparatus. In this case, the readout program code itself implements the functions of the above-mentioned embodiments, and the program code and the program product that stores the program code constitute the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the readout program code is written in a memory of the extension card or unit.

As many apparently widely different embodiments of the present invention can be made without departing from the spirit and scope thereof, it is to be understood that the invention is not limited to the specific embodiments thereof except as defined in the claims.

What is claimed is:

1. A data management system for managing data by appending meta data for a data search to managed data, said system comprising:

means for accepting a user's selection of the managed data to which the meta data is to be appended;

means for accepting a user's selection of a type of content from among plural types of content of the managed data;

means for displaying on a screen of a display device a group of candidates of meta data based on the user's selection of type of content, each group of candidates being prepared in advance in correspondence with each type of content of the managed data;

means for changing a display of a group of candidates of meta data to be provided in response to a change of the selected type of content of the managed data;

means for accepting a user's selection of meta data to be appended to the selected managed data from the provided group of candidates of the meta data; and means for appending the selected meta data to the selected managed data by saving an association between the selected meta data and the selected managed data.

2. A system according to claim 1, further comprising:
means for accepting an input of a search condition used to search for the managed data; and
means for searching for the managed data associated with the search condition on the basis of the input search condition and the meta data.

3. A system according to claim 2, further comprising means for partially providing contents of the managed data found by the search performed by said searching means.

4. A system according to claim 3, further comprising:
means for accepting a user's selection of data that provides contents thereof from the managed data found by the search;
means for acquiring other data associated with the selected data; and
means for providing contents of the selected data and the other acquired data.

5. A system according to claim 4, wherein the managed data is data of a moving image, and
wherein said providing means provides contents of the selected data and the other acquired data by displaying a series of moving images consisting of a moving image of the selected data and a moving image of the other acquired data.

6. A system according to claim 3, wherein the managed data is at least one of image data and audio data, and a combination thereof.

7. A system according to claim 1, wherein said means for accepting the user's selection of the managed data includes means for accepting a selection of at least a portion of the managed data to identify sub-data, and said saving means includes means for saving the sub-data and the meta data in association with each other.

8. A system according to claim 7, wherein the managed data is moving image data, and the sub-data is frame image data which forms the moving image data.

9. A system according to claim 1, wherein the types of content of the managed data are defined for respective events in everyday life.

10. A system according to claim 9, wherein said means for accepting the user's selection of a type of content of the managed data includes means for accepting a selection of the event, and said means for changing a display of a group of candidates meta data includes means for changing the group of the candidates of meta data to be provided according to the selected event.

11. A system according to claim 1, wherein the managed data is data of an image, and
said system further comprises means for displaying the image associated with the selected managed data and the candidates of meta data together.

12. A system according to claim 1, wherein the managed data is at least one of image data and audio data, and a combination thereof.

13. A data management method for managing data by appending meta data for a data search to managed data, said method comprising the steps of:
accepting a user's selection of the managed data to which the meta data is to be appended;
accepting a user's selection of a type of content from among plural types of content of the managed data;
displaying on a screen of a display device a group of candidates of meta data based on the user's selection of type of content, each group of candidates being prepared in advance in correspondence with each type of content of the managed data;
changing a display of candidates of meta data to be provided in response to a change of the selected type of content of the managed data;
accepting a user's selection of a meta data to be appended to the selected managed data from the provided group of candidates of the meta data; and
appending the selected meta data to the selected managed data by saving an association between the selected meta data and the selected managed data.

14. A method according to claim 13, further comprising the steps of:
accepting an input of a search condition used to search for the managed data;
searching for the managed data associated with the search condition on the basis of the input search condition and the meta data; and
partially providing contents of the managed data found by the search performed in said searching step.

15. A computer-executable program stored on a computer-readable medium, for executing a data management method for managing data by appending meta data for a data search to managed data, said program comprising:
code for accepting a user's selection of the managed data to which the meta data is to be appended;
code for accepting a user's selection of a type of content from among plural types of content of the managed data;
code for displaying on a screen of a display device a group of candidates of meta data based on the user's selection of type of content, each group of candidates being prepared in advance in correspondence with each type of content of the managed data;
code for changing a display of a group of candidates of meta data to be provided in response to a change of the selected type of content of the managed data;
code for accepting a user's selection of meta data to be appended to the selected managed data from the provided group of candidates of the meta data; and
code for appending the selected meta data to the selected managed data by saving an association between the selected meta data and the selected managed data.

16. A program according to claim 15, further comprising:
code for accepting an input of a search condition used to search for the managed data;
code for searching for the managed data associated with the search condition on the basis of the input search condition and the meta data; and code for partially providing contents of the managed data found by the search performed by said code for searching.

17. A data management system for managing data by appending meta data for a data search to data to be managed, said system comprising:
means for accepting a user's selection of the types of content from among plural types of content of the data to be managed;
means for providing a screen of a display device with a group of candidates of meta data based on the user's selection of type of content each group of candidates being prepared in advance in correspondence with each type of content of the data to be managed;
means for changing a display of a group of candidates of meta data to be provided in response to a change of the selected type of content of the data to be managed;
means for accepting a user's selection of meta data from the provided group of candidates of the meta data;
means for inputting the data to be managed to which the selected managed data is appended after the user's selection of the meta data; and
means for appending the selected meta data to the selected managed data by saving an association between the selected meta data and the selected.

18. A system according to claim 17, further comprising:
means for accepting input of a search condition used to search for the managed data;
means for searching for the managed data associated with the search condition on the basis of the input search condition and the meta data; and
means for partially providing contents of the managed data found by the search performed by said means for searching.

19. A system according to claim 17, wherein said means for accepting the user's selection of meta data includes means for accepting a plurality of meta data, and said means for saving the selected meta data and the input data includes means for saving the meta data selected among the plurality of meta data by the user after the data to be managed are inputted and the input data as managed data in association with each other.

20. A data management method for managing data by appending meta data for a data search to data to be managed, said method comprising the steps of:
accepting a user's selection of the types of contents from among plural types of content of the data to be managed;
displaying on a screen of a display device a group of candidates of meta data based on the user's selection of type and content, each group of candidates being prepared in advance in correspondence with each type of content of the data to be managed;
changing a display of candidates of meta data to be provided in response to a change of the selected type of the content of the data to be managed;
accepting a user's selection of meta data from the provided group of candidates of meta data;
inputting the data to be managed to which the selected meta data is appended after the user's selection of the managed data; and
appending the selected meta data to the selected managed data by saving an association between the selected meta data and the selected managed.

21. A method according to claim 20, wherein said step of accepting the user's selection of meta data includes accepting a plurality of meta data, and said step of saving the selected meta data and the input data includes saving the meta data selected among the plurality of meta data by the user after the data to be managed are inputted and the input data as managed data in association with each other.

22. A computer-executable program stored on a computer-readable medium, for executing a data management method for managing data by appending meta data for a data search to managed data, said program comprising:
code for accepting a user's selection of the types of contents from among plural types of content of the data to be managed;
code for displaying on a screen of a display device a group of candidates of meta data based on the user's selection of type of content, each group of candidates being prepared in advance in correspondence with each type of content of the data to be managed;
code for changing a display of a group of candidates of meta data to be provided in response to a change of the selected type of content of the data to be managed;
code for accepting a user's selection of meta data from the provided group of candidates of meta data;
code for inputting the data to be managed to which the selected meta data is appended after the user's selection of the managed data; and
code for appending the selected meta dat to the selected managed data by saving an association between the selected meta data and the selected managed data.

23. A program according to claim 22, wherein said code for accepting the user's selection of meta data includes code for accepting a plurality of meta data, and said code for saving the selected meta data and the input data includes code for saving the meta data selected among the plurality of meta data by the user after the data to be managed are inputted and the input data as managed data in association with each other.

* * * * *

UNITED STATES PATENT AND TRADEMARK OFFICE
CERTIFICATE OF CORRECTION

| | | |
|---|---|---|
| PATENT NO. | : 7,051,048 B2 | Page 1 of 2 |
| APPLICATION NO. | : 09/961423 | |
| DATED | : May 23, 2006 | |
| INVENTOR(S) | : Hidetomo Sohma et al. | |

It is certified that error appears in the above-identified patent and that said Letters Patent is hereby corrected as shown below:

DRAWINGS:
Sheet 17, Figure 17, "BRIDAL OF" should read -- OF BRIDAL --.

COLUMN 8:
Line 52, "indicted" should read -- indicated --.

COLUMN 9:
Line 6, "go" should be deleted.

COLUMN 11:
Line 1, "objets," should read -- objects, --.

COLUMN 15:
Line 20, "device" should read -- devices --; and
Line 64, "inputs" should read -- input --.

COLUMN 18:
Line 41, "device" should read -- devices --;
Line 42, "image," should read -- image --; and
Line 63, "inputs" should read -- input --.

COLUMN 19:
Line 10, "inputs" should read -- input --.

COLUMN 23:
Line 12, "content" should read -- content, --; and
Line 25, "selected." should read -- selected managed data. --.

UNITED STATES PATENT AND TRADEMARK OFFICE
CERTIFICATE OF CORRECTION

PATENT NO. : 7,051,048 B2
APPLICATION NO. : 09/961423
DATED : May 23, 2006
INVENTOR(S) : Hidetomo Sohma et al.

It is certified that error appears in the above-identified patent and that said Letters Patent is hereby corrected as shown below:

COLUMN 24:
Line 11, "managed." should read -- managed data. --; and
Line 40, "dat" should read -- data --.

Signed and Sealed this

Thirtieth Day of January, 2007

JON W. DUDAS
*Director of the United States Patent and Trademark Office*